United States Patent [19]

Zeidler

[11] Patent Number: 5,468,511
[45] Date of Patent: Nov. 21, 1995

[54] METHOD FOR REMOVAL OF CHOLESTEROL AND FAT FROM LIQUID EGG YOLK WITH RECOVERY OF FREE CHOLESTEROL AS A BY-PRODUCT

[75] Inventor: Gideon Zeidler, Los Angeles, Calif.

[73] Assignee: The Regents of the University of California, Oakland, Calif.

[21] Appl. No.: 88,227

[22] Filed: Jul. 6, 1993

Related U.S. Application Data

[63] Continuation-in-part of Ser. No. 842,530, Feb. 28, 1992, abandoned.

[51] Int. Cl.$^6$ .............................. A23L 1/32; A23L 1/015
[52] U.S. Cl. ..................... 426/614; 426/417; 426/425; 426/429; 426/431; 426/476; 426/480; 426/492; 426/494; 426/495
[58] Field of Search ..................... 426/424, 425, 426/429, 431, 437, 478, 480, 490, 492, 495, 614, 601, 420, 417, 476

[56] References Cited

U.S. PATENT DOCUMENTS

| | | | |
|---|---|---|---|
| 3,563,765 | 2/1971 | Melnick et al. | 99/113 |
| 3,717,474 | 2/1973 | Fioriti et al. | 99/113 |
| 3,846,455 | 11/1974 | Ikekawa et al. | 260/397.2 |
| 3,928,397 | 12/1975 | Ikekawa et al. | 260/397.2 |
| 3,941,892 | 3/1976 | Glasser et al. | 426/104 |
| 4,103,040 | 7/1978 | Fioriti et al. | 426/614 |
| 4,183,847 | 1/1980 | Deshmukh | 260/112 R |
| 4,183,852 | 1/1980 | Kaiser | 260/239.55 |
| 4,333,959 | 6/1982 | Bracco et al. | 426/614 |
| 4,374,776 | 2/1983 | Struve et al. | 260/397.25 |
| 4,762,792 | 8/1988 | Girgis et al. | 435/244 |
| 4,804,555 | 2/1989 | Marschner et al. | 426/601 |
| 4,996,072 | 2/1991 | Marschner et al. | 426/417 |
| 5,091,203 | 2/1992 | Conte, Jr. et al. | 426/417 |

FOREIGN PATENT DOCUMENTS 0048818  4/1982  European Pat. Off. .

OTHER PUBLICATIONS

R. Treybal. 1980 Mass–Transfer Operations. 3rd Ed. McGraw–Hill Book Company, New York, p. 666.
Stadelman et al., 1977, Egg Science and Technology 2nd Ed. AVI Publishing Co., Westport, Conn. p. 73.
Gideon Zeidler and R. Freitas, Low Cost Equipment Design for the Instantization and Flavor Improvement of Dry Protein Beverages (Soy Based), Engineering and Foods, vol. 2, (1984), 14:733–755.
Rudolf Schoenheimer, The Presence of Cholesterol in the Feces, *J. Biol. Chem.*, (1934), 105:355–357.
Frank D. Gunstone, et al., Deodorisation, *Lipids in Foods Chemistry, Biochemistry and Technology*, Chapter 15, pp. 130–138, 1980.

*Primary Examiner*—Anthony J. Weier
*Attorney, Agent, or Firm*—Hana Dolezalova

[57] ABSTRACT

A method for extraction and removal of cholesterol from untreated liquid egg yolk with simultaneous production of cholesterol as a by-product. The removal of cholesterol from the untreated liquid egg yolk is achieved by the extraction of cholesterol into a vegetable oil by ultra high pressure homogenization producing liquid egg yolk having reduced amount of cholesterol. The cholesterol extracted into the vegetable oil is further removed from the oil by steam stripping method, allowing a recycling of the steam stripped extraction oil. Cholesterol is recovered as the extraction by-product from the aqueous steam stripping distillate.

16 Claims, 6 Drawing Sheets

Number of Passes Through the Homogenizer

Pressure
— □ — 3000 psi
— ◆ — 4000 psi
— ■ — 5000 psi

Yolk-Oil Ratio 1:4

5,468,511

METHOD FOR REMOVAL OF CHOLESTEROL AND FAT FROM LIQUID EGG YOLK WITH RECOVERY OF FREE CHOLESTEROL AS A BY-PRODUCT

This is a continuation-in-part of the U.S. application Ser. No. 07/842,530 filed Feb. 28, 1992, now abandoned.

BACKGROUND OF THE INVENTION

1. Field of Invention

This invention concerns a method for extraction and removal of at least 70% of cholesterol from liquid egg yolk with simultaneous production of unbound or free cholesterol as a by-product. In particular, this invention concerns (a) a production of decreased cholesterol liquid egg yolk by removal of cholesterol from the untreated liquid egg yolk into a vegetable extraction oil using ultra high pressure homogenization; (b) removal of cholesterol from the extraction oil by suitable methods to make the oil recyclable; and (c) the isolation of cholesterol from the oil as the by-product of the cholesterol extraction from liquid.

2. Related Disclosures

A growing consumer demand for reduced cholesterol products led to development of many methods for extraction of cholesterol from the liquid or dry egg yolk and its products. The primary disadvantages connected with these methods are the need for chemical or mechanical pretreatment of the liquid egg yolk. These pretreatments tend to change the taste, appearance and/or the texture of the egg yolk. Moreover, many of these methods use solvents which may present health risk or are so harsh that the restoration of the egg texture is impossible. The use of such decholesterolized egg product is greatly limited and commercially unsound.

Over years, many of these methods were patented. For example, the U.S. Pat. No. 3,958,034 describes a fractionation of the egg yolk material by centrifugation into cholesterol, fat, and protein. The described ultracentrifugation method is lengthy and costly. U.S. Pat. No. 3,563,765 concerns the process for obtaining low cholesterol dry egg yolk with extraction into hexane, an organic solvent undesirable to be used in processing the food for human consumption.

The vegetable oil extraction of cholesterol has been described in the U.S. Pat. No. 4,103,040 and in its predecessor, the U.S. Pat. No. 3,717,474. The described extraction is lengthy and is achieved with large volumes of the non-recyclable oil which makes it neither practical nor economical. Four to twenty-five times more of fresh oil than yolk is needed for each extraction, which is twice to twelve times the cost of the yolk. The required quantities of oil needed for each extraction result in an unacceptable increase in production cost.

U.S. Pat. No. 4,234,619 concerns decholesterolized and defatted egg powder and method of producing such egg powder by extraction of cholesterol into dimethyl ether. Again, this method involves the use of unhealthy and hazardous solvent for use with foodstuff for human consumption. U.S. Pat. No. 4,333,959 concerns a process of reducing the amounts of cholesterol in egg yolk vegetable oil dispersion by centrifugation. All above-named processes are either unhealthy or highly uneconomical.

Thus, it would be highly desirable to have available method for cholesterol extraction from the egg yolk which method would avoid a need for pretreatment of eggs or the use of harmful solvents and which would, at the same time, also be industrially feasible and economical.

Vegetable oil extraction processes, as described above, were shown to be able to achieve substantial removal of cholesterol. However, the amount of the fresh oil needed for cholesterol extraction, usually from four to 25 (weight/weight) times more than the egg yolk makes such processes impractical and uneconomical because after the extraction, such oil must be discarded. Even when as low amount of the oil, i.e., only two times more of the fresh oil than egg yolk is used, if such oil is not recyclable, the waste of the oil on such a large scale is not economically feasible.

Thus, it would be of great advantage to have a procedure which would allow the removal of substantial amount of cholesterol from the egg yolk into the oil and subsequent removal of cholesterol from the oil making such oil suitable for reuse or recycling for further cholesterol extraction from the egg yolk.

Methods for removal of odors, a deodorization of oxidized fish oils have been described in U.S. Pat. Nos. 4,804,555 and 4,996,076. These patent describe a technique known as a steam stripping. The steam stripping removes almost all non-esterified cholesterol from fish, dairy oils, and fats.

The steam stripping removal of cholesterol from the egg yolk directly has not been hitherto described and is probably not feasible without making the egg yolk-oil emulsion and even then, without special treatment, the egg yolk would coagulate and clog the steam stripping apparatus making the process highly impractical. Moreover, even if such methods were available, because of the large amount of cholesterol contained in the egg yolk, the removal of such large amount of cholesterol as a waste would be uneconomical and rather burdensome.

On the other hand, production or synthesis of cholesterol for its many industrial uses is very costly with production cost for one pound of non-purified cholesterol running around $28–$30. While a production of lecithin is described in U.S. Pat. No. 4,822,926 and the extraction of oil from egg yolk is disclosed in U.S. Pat. No. 4,219,585, the production of cholesterol from the egg yolk wherein the egg yolk would be preserved and utilized is not known.

It would thus be extremely useful to utilize the method for removal of unbound cholesterol from the liquid egg yolk for simultaneous production of cholesterol as the by-product.

It is, therefore, a primary object of this invention to provide a method for substantial (70%–98%) removal of cholesterol from the egg yolk by ultra high pressure homogenization extraction into a vegetable extraction oil, combined with the steam stripping removal of cholesterol from the oil laden with cholesterol removed from the egg yolk, and with the subsequent separation, isolation, and purification of cholesterol for industrial use.

All cited references and patents are hereby incorporated by reference in their entirety.

SUMMARY

One aspect of this invention is a method for removal and extraction of 70%–98% of cholesterol from the liquid egg yolk into vegetable oil providing a decholesterolized liquid egg yolk product, followed by a removal of cholesterol from the extraction oil making the oil recyclable for further cholesterol extraction from the egg yolk, and at the same time producing a substantially pure cholesterol as a by-product.

Another aspect of this invention is the extraction of 50–90% of cholesterol from egg yolk into the vegetable oil wherein the egg yolk-oil ratio is from 1:0.5 to 1:4.

Still another aspect of the current invention is the vegetable oil extraction of cholesterol from the egg yolk achieved through an ultra high pressure homogenization under pressure between 4,000–21,000 psi.

Yet another aspect of the current invention is the extraction of cholesterol into the vegetable oil wherein the vegetable oil laden with cholesterol is treated with steam stripping method in such a way that a substantial amount of cholesterol is removed and the oil can be reused and recycled up to ten times for additional extractions of the egg yolk.

Still yet another aspect of the current invention is a method wherein the cholesterol extraction from the liquid egg yolk into the vegetable oil is enhanced by number of passes through a homogenizer and combined with a steam stripping method in such a way that the cholesterol recovered from the oil with steam stripping or with some other technique is suitable to be used industrially as a separate product.

Still yet another aspect of this invention is a method for producing decholesterolized liquid egg yolk which can be used as a liquid or dry product or reconstituted with egg white and processed into whole egg liquid or dry products.

DETAILED DESCRIPTION OF THE INVENTION

Figure 1:
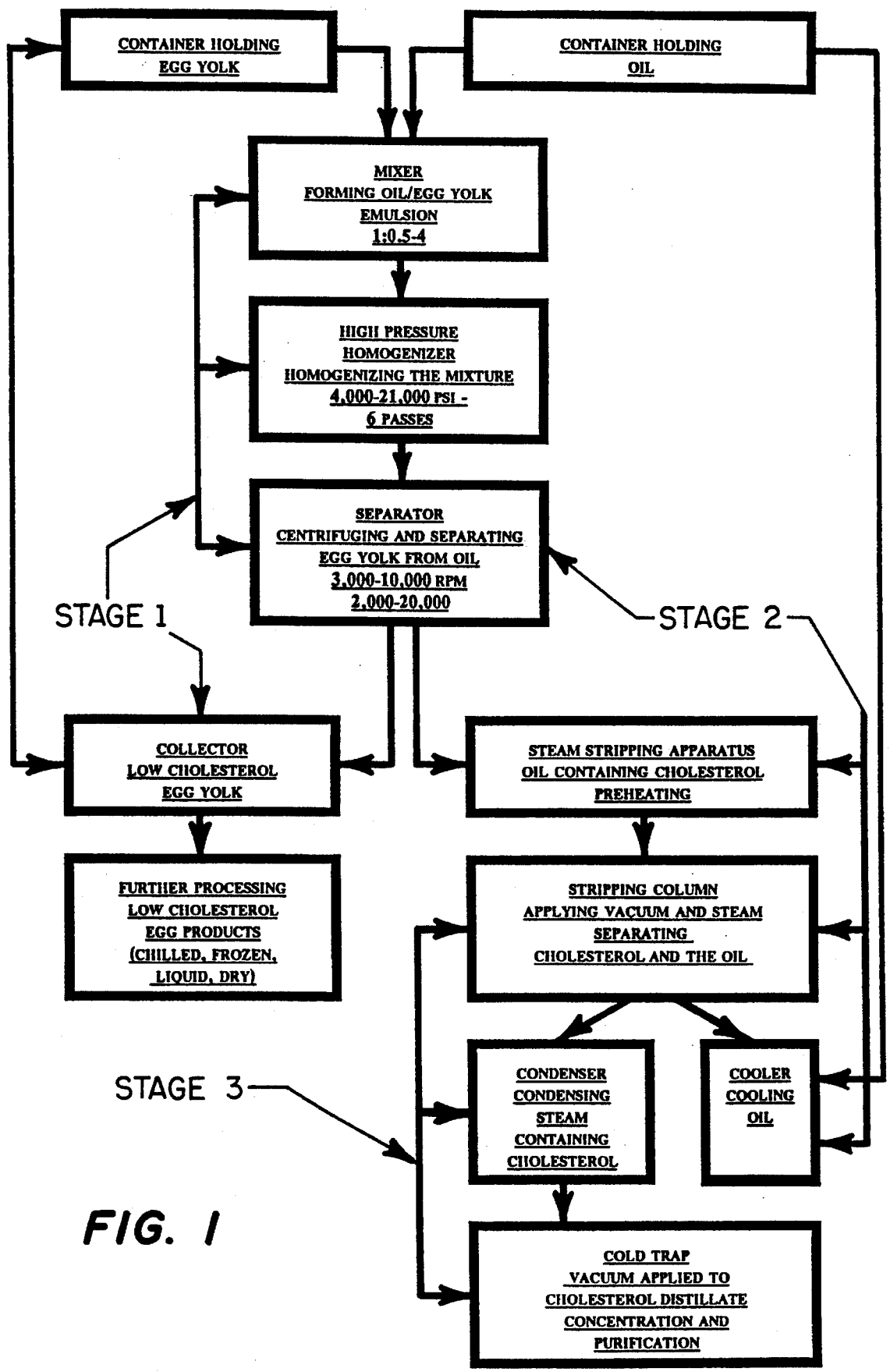
FIG. 1 is a scheme illustration of the method of the current invention.

Current invention concerns a highly economical method for extraction and removal of cholesterol from liquid egg yolk into a vegetable oil with simultaneous production of cholesterol as a by-product. The ultra high pressure homogenization used for cholesterol extraction from the egg yolk/oil mixture allows the removal of large amounts of cholesterol from the liquid egg yolk into the vegetable oil in a very short time and requires only relatively small amount of oil for such cholesterol extraction. The extraction oil is subsequently treated with a steam stripping method resulting in sufficiently purified oil to be recyclable for further liquid egg yolk extraction. Substantially pure cholesterol is recovered as a by-product. The method of this invention provides removal of cholesterol from the egg yolk without changing the properties of the egg yolk.

Additionally, the method is commercially advantageous because, besides producing low cholesterol liquid egg yolk, it allows the removal of cholesterol from the extraction oil making such oil suitable for recycling and at the same time it produces substantially pure non-esterified cholesterol as the by-product of the egg yolk decholesterolization.

The process of the current invention ultimately provides two industrially desirable products, the reduced cholesterol egg yolk product and substantially pure cholesterol suitable for further industrial use wherein said method further recovers the vegetable oil sufficiently purified to be useful for further cholesterol extraction from the egg yolk.

The method provides a high quality low cholesterol liquid egg yolk suitable for freezing, drying or for the production of low cholesterol dried egg yolk or reconstituted whole egg products, as well as low cholesterol chilled or frozen liquid egg products. The low cholesterol egg yolk can be conveniently processed into various chilled or frozen egg products, or it can be used directly to produce egg yolk based products such as low cholesterol mayonnaise.

The removed and recovered cholesterol can be concentrated and purified into a suitable form for production of pharmaceutical and cosmetic products or as an essential aquaculture feed additive.

The extraction oil is purified by steam stripping which removes cholesterol from the oil making the extraction oil recyclable up to ten times without loosing its extraction property.

The extraction of cholesterol with the current method utilizes the shearing process which separates the cholesterol from its weak binding to the egg yolk lipoprotein complex and transfers it to the oil, leaving the lipoprotein intact in the egg yolk. The ultra high pressure homogenization accelerates this process which, under these conditions, requires a lesser volume of the extraction oil. Under these conditions, the phospholipids which are retained in the egg yolk preserve the emulsifying characteristics of the decholesterolized egg yolk as well as its organoleptic characteristics and products texture. Resulting low cholesterol egg yolk is a high quality egg yolk product having typically no more than 10%–15% of the residual cholesterol.

The method consists of two primary processes. One process removes cholesterol from the egg yolk into vegetable oil, the second process removes cholesterol from the vegetable oil.

In the first process, the extraction of cholesterol from the egg yolk into the vegetable oil is achieved by ultra high pressure homogenization of the liquid egg yolk/vegetable oil mixture which produces decholesterolized liquid egg yolk as one product and the cholesterol laden oil as the second product of the ultra high pressure homogenization.

In the second process, cholesterol is removed from the cholesterol laden oil with the hot steam using the steam stripping method. The steam stripping process removes almost all cholesterol from the oil thus producing sufficiently purified oil useful for recycling. Subsequently, cholesterol is separated and isolated as the second product.

The cholesterol extraction from the egg yolk is thus advantageously utilized to produce substantial quantities of decholesterolized liquid egg yolk and of substantially pure cholesterol as the by-product of the egg yolk decholesterolization.

The actual process steps involved in this method are separated into three stages and 17 steps:

Stage 1

(1) forming mixture from the liquid egg yolk and oil mixed in a ratio from 1:0.5–4 of liquid egg yolk to oil;

(2) removing cholesterol from of the liquid egg yolk by regular or airless ultra high pressure homogenization extraction of cholesterol from the egg yolk/oil emulsion into the vegetable extraction oil at pressure between 4,000–21,000 psi;

(3) separating the low cholesterol liquid egg yolk from the extraction oil now containing cholesterol, by centrifugation at 2,000–20,000 rpm;

(4) collecting low cholesterol liquid egg yolk in a collector;

(5) determining the amount of cholesterol remaining in the liquid egg yolk;

(6) optionally repeating steps 1–5 three or more times;

(7) processing low egg yolk into low cholesterol containing egg products;

Stage 2

(8) moving the extraction oil containing cholesterol removed from the egg yolk from the separator into a steam stripping apparatus;

(9) preheating the oil with steam;

(10) extracting cholesterol from the vegetable oil into a steam distillate by steam stripping under vacuum;

(11) separating the stripped oil from the steam distillate now containing cholesterol;

(12) cooling the stripped oil;

(13) recycling the stripped oil for use in steps 1–4 for up to 10 times;

Stage 3

(14) moving the cholesterol containing steam distillate into a condenser;

(15) condensing the steam distillate into water by cooling it and moving it through a cold trap under vacuum;

(16) recovering solidified cholesterol from the condensate in the cold trap; and

(17) recovering, isolating and purifying cholesterol.

The low cholesterol liquid egg yolk is suitable for use as the liquid or dry egg yolk product or for reconstitution with the egg white into whole egg products. The recovered cholesterol from the steam stripping distillate is suitable for use in cosmetic and pharmaceutical industry and as an aquaculture feed.

The method and the apparatus of this invention are schematically illustrated in the FIG. 1.

The FIG. 1 illustrates the process used for extraction of cholesterol from the liquid egg yolk into the vegetable extraction oil, removal of cholesterol from the extraction oil and recovery of the oil for recycling.

The invention concerns a multistep process which results in production of two important products, namely in production of a liquid egg yolk having removed at least 70% but preferably around 90%–98% of cholesterol as the first product and in production of substantially pure cholesterol as the second product. The process involves 17 steps and three stages, as illustrated in FIG. 1.

The Stage 1 includes steps 1–4 and concerns removal of 70%–98% cholesterol from the liquid egg yolk/oil mixture by the ultra high pressure homogenization in airless conditions.

In the first step, untreated liquid egg yolk, having a regular unchanged pH observed in the intact egg, that is between pH 6.0–6.6, preferably around pH 6.3–6.4, is mixed with a vegetable oil, such as soybean, peanut, corn, olive, safflower or other vegetable oil, preferably with soybean oil, which vegetable oil is substantially free of cholesterol and is without any additives, such as, for example, without monoglycerides, acids, etc. One of the advantages of the invention is that both the egg yolk and the oil are used in their intact state and do not require any manipulation. The untreated liquid egg yolk and the vegetable oil are placed in a mixer and mixed to form egg yolk-oil mixture in a ratio of the egg yolk to the oil of 1 to 0.5–4, preferably in the ratio 1:2.

It is the second advantage of the current invention that the invention works very well with a smallest possible ratio of the egg yolk to the oil, namely with the ratio of 1:0.5. However, the best results are obtained when the ratio of egg yolk to oil is 1:2.

The liquid egg yolk and oil are mixed in the mixer at low speed for 1–5 minutes, the mix is transferred to a specially designed ultra high pressure homogenizer. The ultra high pressure homogenizer creates the egg yolk/oil mixture from the mix. The egg yolk contains about 50% moisture and, due to the formation of large lipoprotein complexes, the egg yolk is a complex oil in water emulsion. Under these conditions, polar compound will be extracted where non-polar molecules such as cholesterol will be mostly retained. Adding the oil to egg yolk and homogenizing it will create water-in-oil emulsion. Under these conditions, non-polar molecules such as cholesterol could be removed from the lipoprotein complex where it is bound and be transferred into the oil medium, while phospholipids will remain in the egg yolk. High pressure homogenization accelerates the speed of the disassociation of the cholesterol from the lipoprotein complex and reduces the amount of added oil needed. This relation increases with the increased pressure of the homogenization process.

It is a third advantage of this invention that the oil which can be used is inexpensive soybean oil which has a low unsaturated to saturated ratio. Such oil is much better suited for recycling, is more stable and has a longer shelflife.

In Step 2, the emulsion from Step 1 is transferred to the specifically designed an ultra high pressure homogenizer which allows homogenization of the emulsion under pressure from 4,000 to 21,000 psi in airless conditions. Typically, such ultra high pressure homogenizer is an airless system comprising an aerator under vacuum. The ultra high pressure homogenizer must meet several conditions. First, it must be able to withstand high pressures from 4,000 up to 21,000 psi. Such high pressures are mandatory if the extraction of above 70% of cholesterol from the egg yolk to the oil within the emulsion is to be achieved quickly. To preserve the quality and the texture of the egg yolk, it is imperative that the extraction is as fast as possible. While the optimum temperature for extraction of cholesterol is between 40°–45° C. to which temperature is the emulsion raised during the homogenization. Long homogenization would cause the homogenizer, including the emulsion content, to overheat which understandably would adversely affects the quality of the liquid egg product and changes the consistency, flavor and texture. In the alternative, the system may be cooled by using cooling tanks. It is preferred that the ultra high pressure homogenization is performed at pressures between 4,000–10,000 psi, for no more than 10 minutes, preferably at a pressure of 8,000–10,000 for about 3–4 minutes/pass. With increased homogenization pressure, the time of the homogenization is shortened to about 1–2 minutes/pass.

Ultra high pressure homogenization allows extraction of substantial amount of cholesterol from the egg yolk to the oil in the emulsion. Ultra high pressure homogenization increases the contact surface space between the egg yolk where the cholesterol is bound and the oil into which it is to be extracted. The extraction of cholesterol under the high pressure disturbs and breaks binding of cholesterol to the egg yolk lipoprotein complex and releases cholesterol into the oil.

Egg yolk is a complex chemical structure having characteristics of oil in water emulsion. Within the complex, lipids are bound to proteins in lipoprotein complex, to which cholesterol is bound. The egg yolk has large amounts of phospholipids which keeps the lipoprotein complex, including cholesterol, stable. Due to similar chemical and physical characteristics of phospholipids and cholesterol, during the process of cholesterol extraction, the extraction of phospholipids is favored over the extraction of cholesterol. The removal of cholesterol from the egg yolk can only be achieved by either decreasing a moisture or by changing the oil-in-water emulsion of the intact egg yolk to a water-in-oil emulsion. The oil-in-water emulsion can be changed into the water-in-oil emulsion, by adding the oil and by shearing the water-in-oil emulsion under the high pressure whereby disturbing cholesterol binding to lipoprotein complex and releasing almost solely cholesterol and retaining phospholipids in the egg yolk. Resulting egg yolk has low content of cholesterol but otherwise it has the same content of phospholipids, vitamins and other components which preserve the quality of the egg yolk.

The ultra high pressure homogenization is performed in airless conditions. Airless conditions cause less oxidation within the egg yolk, prevent the development of rancidity, preserve the flavor and texture of obtained low cholesterol liquid egg yolk and due to elimination of all these unfavorable changes, it extends the shelf-life of the product. Airless, fast, ultra high pressure homogenization of this invention does not require cooling. Typically, the process is performed in homogenizer allowing 5–6 passes, that is one volume of emulsion is quickly homogenized under the high pressure and passed to another tank where it is again homogenized, etc. In this mode, after 5–6 passes, extraction of cholesterol reaches well above 90%. The time needed for the homogenization, however, typically does not exceed 30 minutes, but is preferably around 10–12 minutes for six passes. The homogenization process can, of course, be repeated as many times as necessary. For removal of cholesterol to and above 90%, typically one to two runs with six passes each is sufficient from the emulsion containing 1:2; egg yolk/oil ratio, and pressure between 4,000–6,000 psi/12 minutes.

The third step concerns a recovery of liquid egg yolk having low content of cholesterol. The mixture of oil and liquid egg obtained after homogenization, where the cholesterol is now extracted into the oil, transferred to a separate vessel and centrifuged for 2–60, preferably for about 10 minutes at room temperature, of 2,000–20,000 rpm, preferably at 10,000.

The Step 4 includes physical separation and recovery of low cholesterol containing liquid egg yolk.

In the separator, oil containing cholesterol is separated from the egg yolk in Step 4. The egg yolk is moved to a collector and in Step 5 the level of remaining cholesterol is determined by methods known in the art or described hereafter. When the removed percentage of cholesterol is sufficient, the liquid egg yolk is either used as such or further processed in Step 7. Further processing includes reconstitution with egg white into the whole egg, drying, freeze-drying, chilling, freezing, etc.

If the amount of removed cholesterol is not sufficient, or the higher degree of cholesterol removal is desired, the egg yolk obtained in Step 4 is returned in Step 6 to an empty container holding the egg yolk and Steps 1–5 are repeated one or more times.

Stage 2 includes Steps 8 through 13 and concerns recovery of cholesterol from the extraction oil by purification of the extraction oil for recycling with steam stripping, supercritical extraction or some such purification method.

In Step 8, the extraction oil containing cholesterol which forms an upper layer in the separation vessel is moved to a steam stripping or other apparatus used for recovery of cholesterol and purification of the extraction oil. The best mode for the recovery of cholesterol and purification of the extraction oil is steam stripping method, which is preferred. In the Step 9, in a steam stripping apparatus, the oil is first preheated with steam to temperatures between about 230°–270° C., preferably between 244°–260° C., and cholesterol is removed from the oil, as in Step 10, under vacuum using between 5% and 15% of steam with flow rate of the steam stripping between 5–15 lbs/hour. Steam stripping is a vacuum steam distillation where, at reduced pressures (1–7 mmHg), under vacuum and at elevated temperature, when the steam is introduced under these conditions cholesterol becomes volatile and is removed into the steam as in Step 10. Under vacuum and at high temperature, the steam makes intimate contact with the oil and, the steam moved by vacuum force, strips the oil of cholesterol. A cholesterol containing steam distillate moves to the condenser as in Step 14, separating the steam distillate carrying cholesterol from the stripped oil in Step 11.

In Step 12, following the steam stripping, the stripped oil is cooled in a cooler, its purity, that is the percentage of removed or remaining cholesterol is determined and, if sufficiently pure, the oil is moved back to a container holding oil used for preparing emulsion of Step 1. The oil is used for recycling for up to 10 times which, with lower volumes needed for the cholesterol extraction, provides another advantage of the current method.

The use of the soybean oil which has low ratio of unsaturated to saturated fat makes this oil especially suitable for recycling because this oil is relatively non-volatile and, therefore, releases cholesterol into the steam while it itself remains intact without any damage and therefore can be recycled as many times as feasible.

Stage 3 concerns recovery of cholesterol and involves Steps 14–17. In the Step 14, steam carrying cholesterol stripped from the oil is carried through a condenser where the steam is cooled down and condensed to water. Cholesterol is practically insoluble in water and, consequently, immediately upon cooling the steam distillate, cholesterol begins to solidify.

In Step 15, the condensation water product containing cholesterol is moved, under vacuum, through a cold trap, where, due to applied vacuum, water is removed and solid cholesterol is left behind in the cold trap. After each steam stripping cycle, cholesterol is removed and, as in Step 17, submitted to purification techniques. Typically, cholesterol is made into 5% of oil solution, using any vegetable oil substantially free from cholesterol and other impurities, the mixture is homogenized, centrifuged and cholesterol is isolated and solidified.

Recovered cholesterol is used for preparation of steroidal drugs, cosmetic products, or in a lesser pure form, as aquafeed.

I. Extraction of Cholesterol into an Vegetable Oil—Stage 1

The liquid egg yolk product having substantially, at least 70% but typically above 90%, removed cholesterol is a product of the ultra high pressure homogenization of the liquid egg yolk/vegetable oil mixture having ratio from 1:0.5 to 1:4 of egg yolk/oil. The ultra high pressure homogenization allows the fast high yield extraction of cholesterol from the egg yolk into the oil. Following the homogenization, the decholesterolized egg yolk and cholesterol in oil mixture are separated by centrifugation. The decholesterolized egg yolk may be repeatedly subjected to the same process of ultra high pressure homogenization either by passing several times through one homogenizer or one time through several homogenizers. The extraction is repeated one or more time under the same or different conditions, as described below.

The extraction of cholesterol into the vegetable oil is achieved by mixing, in proportionate amounts from 0.5–4:1 to preferably 2:1, the vegetable oil with untreated liquid egg yolk at normal pH and at room temperature. The liquid egg yolk processed according to the instant invention does not require any pretreatment such as pH adjustment, freezing, cooling, heating, or other pretreatment, and is used in its intact, untreated form. The vegetable oil used in the process of the current invention may be any vegetable oil which is substantially free of cholesterol, contains no additives, is without monoglycerides, and which is either liquid or partially liquid at room temperature. The oil may be high in saturated, monounsaturated or a poly-unsaturated fatty acid, partially hydrogenated oil or an oil which is a mixture of poly-unsaturated and saturated components. Preferably, the oil has a low ratio of unsaturated to saturated lipids. Examples of suitable vegetable oils are vegetable seed oils, such as corn oil, cotton seed oil, soybean oil, canola oil, sesame seed oil, sunflower seed oil, safflower seed oil, coconut oil, palm oil, olive oil, rice bran oil, grape seed oil, pumpkin oil, peanut oil or any combination of these oils. While all these oils are suitable for use as extraction medium for cholesterol, the cost of large quantities of some of these oils needed for cholesterol extraction is prohibitive. One of the advantages of the current invention is that it performs equally well with the low cost and readily available soybean oil as with more expensive oils. Moreover, soybean oil which has a low ratio of unsaturated to saturated lipid was found to be almost as good as the expensive peanut oil and performed far better than other oils such as sunflower, corn, safflower or canola oils.

When the comparative study of extraction of cholesterol from different types of oil was performed as shown in Table 1, it was found that under the same experimental conditions using 1:2 egg yolk-oil mixture, the inexpensive soybean oil afforded almost the same amount of cholesterol extraction as the several times more expensive peanut oil and performed better than other oils. The percentage of cholesterol extractions from sunflower, corn, safflower, and canola oils were considerably smaller. The soybean oil was also found to be very suitable for recycling.

To effectuate the cholesterol extraction from the egg yolk, the oil and the yolk are mixed together and introduced into the high pressure homogenizer, submitted to 5–6 passes and homogenized for 2–30 each pass, preferably for 2–6 minutes per one pass. Typically, the first such oil extraction (six passes) removes around 60–90% of total cholesterol.

Homogenization is performed in the ultra high pressure homogenizer preferably in an airless system. The ultra high pressure homogenization induces rapid cholesterol extraction in low oil:liquid egg yolk ratio (0.5–4:1; oil/yolk), gives better yields of extraction, causes less oxidation, prevents the development of rancidity and considerably extends shelf life of the product due to the absence of the oxidation. Due to high pressures used, the contact surface between the oil and the egg yolk is substantially increased, cholesterol is released from its lipoprotein complex and extracted into the oil.

The ultra high pressure homogenization can alternatively and preferably be performed in an aerator under vacuum to eliminate almost completely the oxidation processes which adversely alter the flavor, texture and the shelf life of the resulting low cholesterol egg products.

Any high pressure system homogenizer having an ability to withstand the pressures up to 21,000 psi, which preferably also operates or provides the airless system, is advantageously used by the current invention. Homogenizers such as H-5000 sanitary homogenizer, M-110T MICROFLUIDIZER® high pressure homogenizer, both obtained from Microfluidics Corp., STANSTED® A0812 cell disrupter from Stansted Fluid Power, Ltd., or modified BINKS® Positive Airless Pump obtained from Binks Manufacturing Co., or high pressure homogenizing head as described in *Engineering and Foods,* 14:733 (1984) were found to be suitable for the purposes of this invention. Test conducted with MICROFLUIDIZER® high pressure homogenizer HC500 demonstrated cholesterol reduction of 63.8–83.1% from egg yolk-oil mixture having ratio 1:2 in double extraction in the laboratory setting.

Typically, the extraction stage involves minimum six passes of the yolk-oil mix through the homogenizer by operating the homogenizer in batch mode with the aid of one mixing tank and six holding tanks or in any other suitable arrangement. Each batch of the yolk-oil mix passes from a holding tank through the homogenizer head and is collected in the next tank. The batch then passes through the homogenizer head into the next holding tank, and the process is repeated until six or more passes are accomplished. Then the batch exits to the separation holding tank for separation process. The low cost Binks System can be advantageously utilized for a continuous process by installing six Binks units in a row at a fraction of cost of a single homogenizer of other brands.

The optimum temperature range for egg yolk/oil extraction is between 40°–45° C. Since the egg yolk is kept under refrigeration, the temperature must be raised gradually to 45° C. Raising temperature is typically done in 5°–10° C. increments. Each pass through the homogenizer increases the temperature of the homogenate by preferably about 5° C. Each batch stays in a holding tank for 10 minutes between consecutive passes. The unit is temperature controlled to keep the temperature of the homogenate within the acceptable limits during the extraction and separation. The tanks can be equipped with rotary stirrers to keep the homogenate mixed and aid in temperature control.

The cholesterol extraction is further influenced by the pressure used for homogenization. Generally, the higher the pressure, the shorter time is needed and higher yield is achieved, however, the optimal pressure for each type of setting may differ and will depend on quantity and ratio of egg yolk/oil, temperature, and homogenizer. The pressure under which the homogenization is performed is between 10–21,000 psi, preferably between 3,000–6,000 psi.

Figure 2:
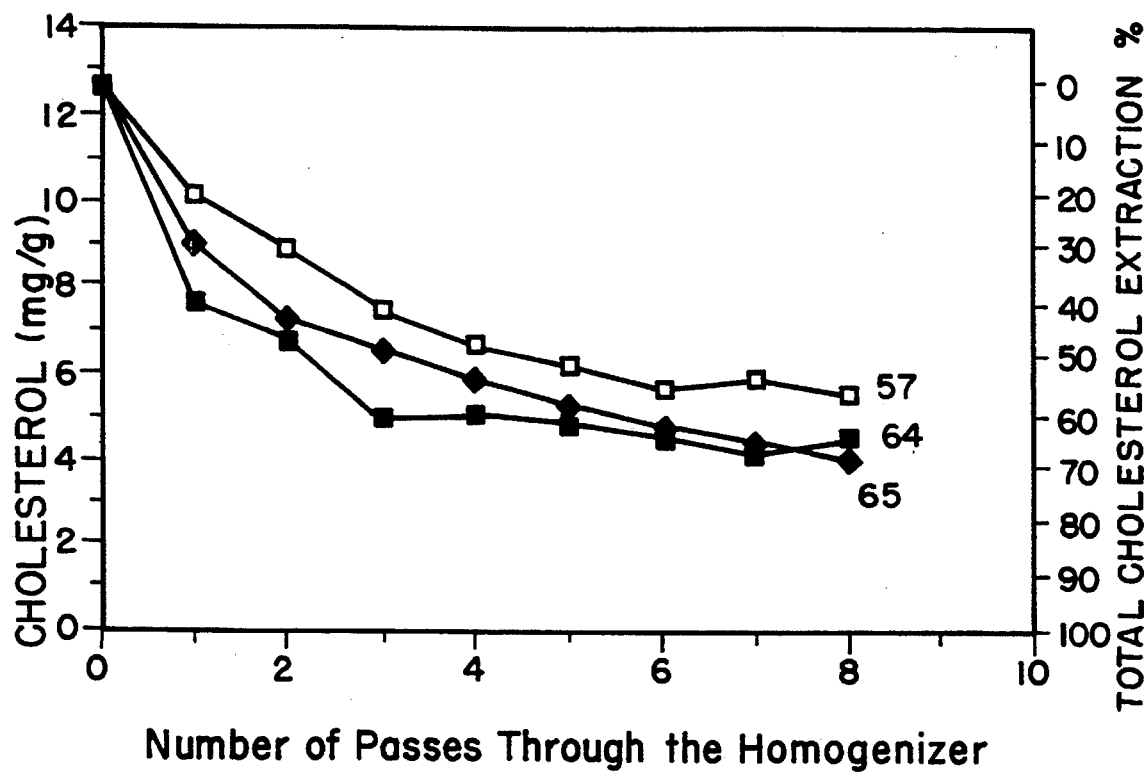
FIG. 2 is a graph showing the effect of ultra high pressure homogenization and number of passes through the homogenizer on percentage of cholesterol removal from egg yolk-oil emulsion (ratio 1:2) after single extraction.
Figure 3:
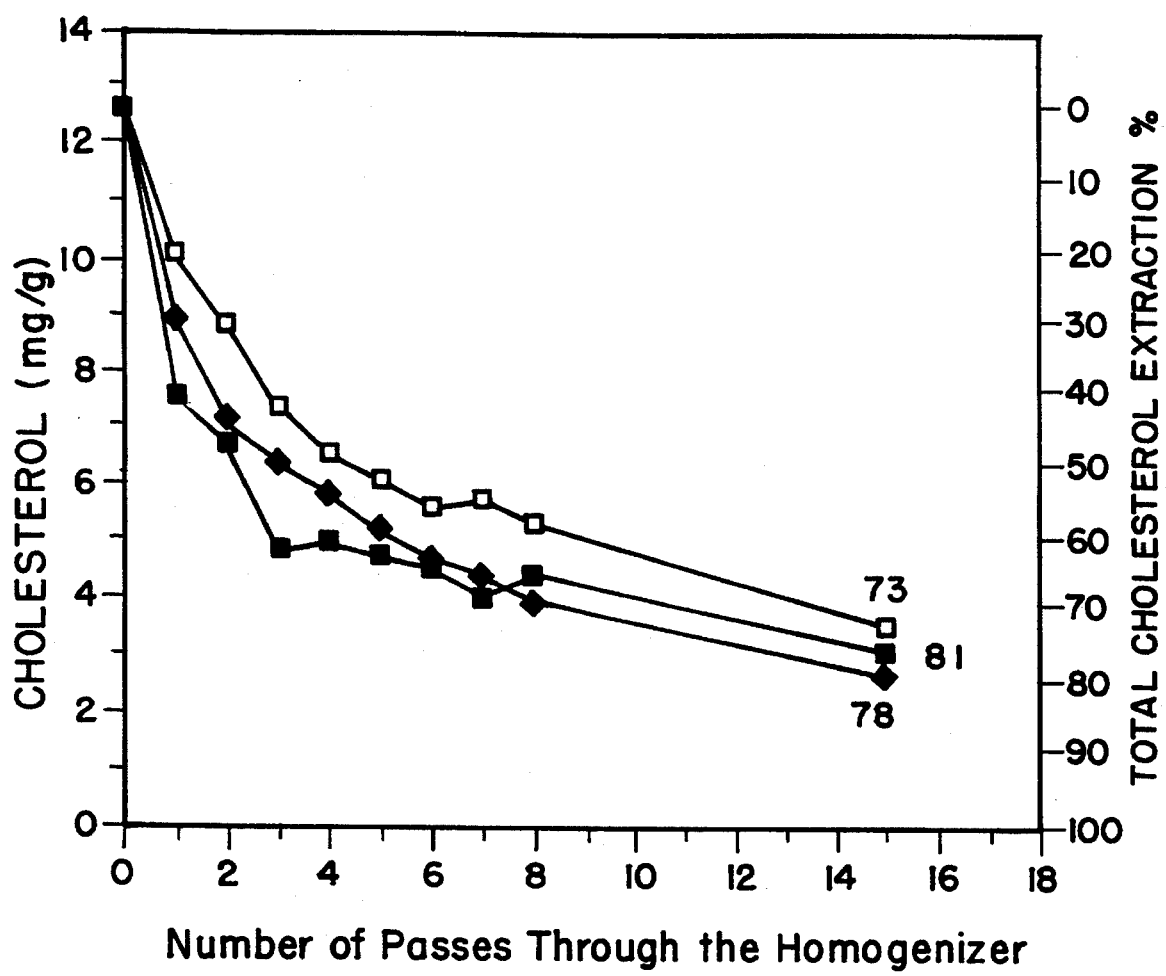
FIG. 3 is a graph showing the percentage of cholesterol removal from 1:2 egg yolk-oil mixture after double extraction.
Figure 4:
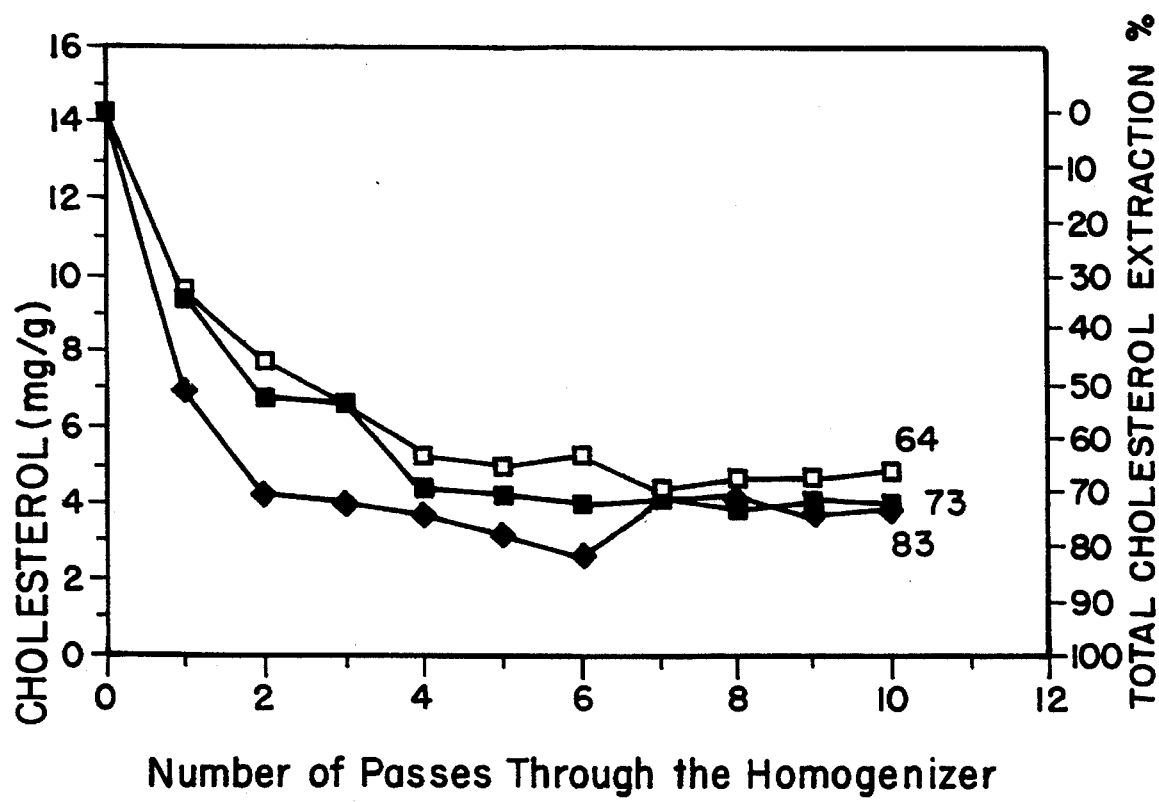
FIG. 4 is a graph showing the percentage of cholesterol removal from 1:4 egg yolk oil mixture after single extraction.
Figure 5:
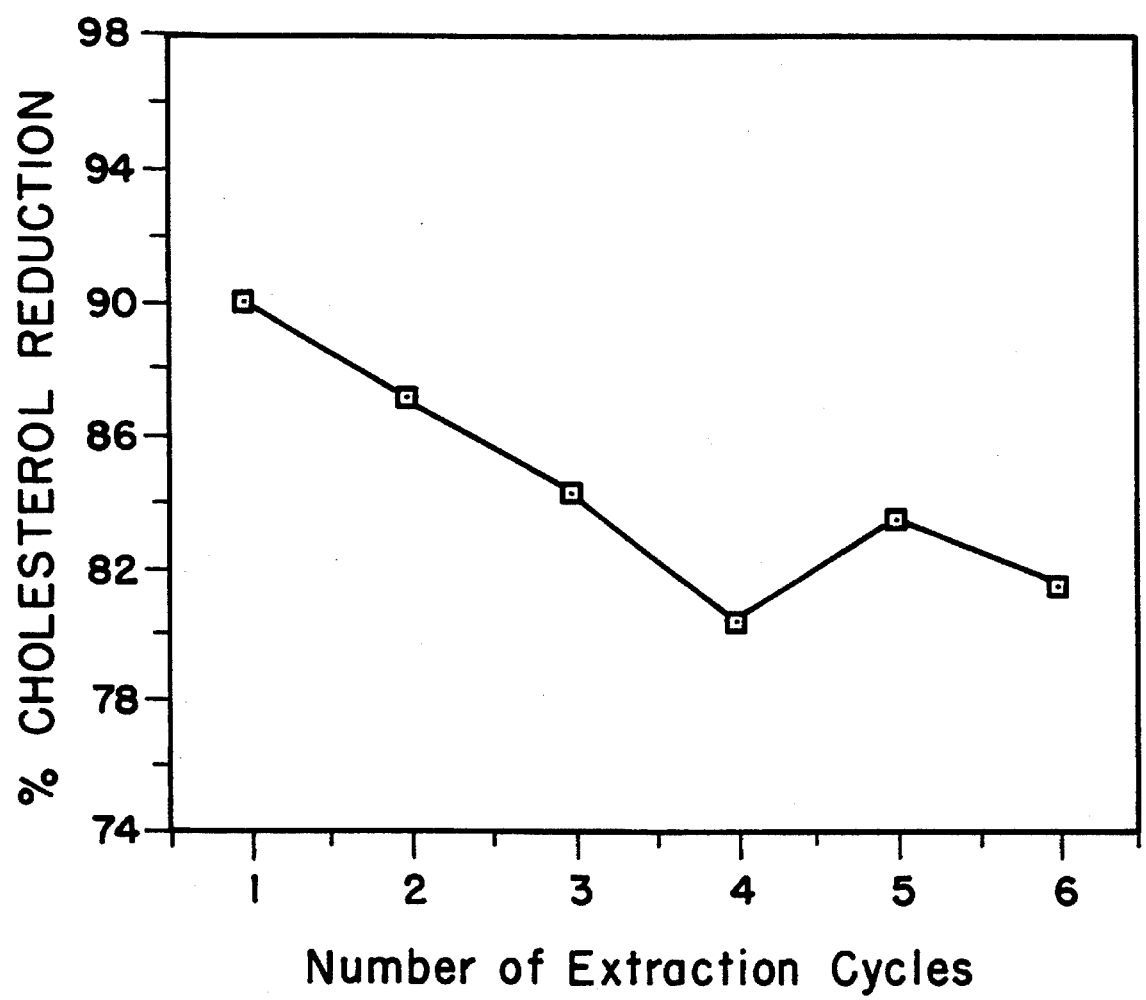
FIG. 5 is a graph showing the effect of number of passes on the removal of cholesterol from the extraction oil by steam stripping.

The effect of elevated pressure in the ultra high pressure homogenizer, the number of passes through the homogenizer, the single versus double extraction and the ratio of oil to egg yolk were studied and results are shown in FIGS. 2–4.

When the effect of single or double extraction of cholesterol was studied, as seen in FIGS. 2, 3, and 4, both the ratio (1:2 to 1:4) of the vegetable oil to the egg yolk, number of extractions, and the pressure (1,300 to 5,000 psi) used for homogenization were found to have an effect on the degree of cholesterol extraction. In the 1:2 egg yolk-oil mixture, single extraction, six passes (FIG. 2), the 5,000 psi pressure was generally better than both 3,000 and 4,000 psi, although the difference between 4,000 and 5,000 psi was small. Under the 3,000 psi pressure, 57% of cholesterol per single extraction was removed. With 4,000 and 5,000 psi pressures, about 64% and 65% of cholesterol was removed in six passes, respectively, and remained in that region even after eight passes. FIG. 3 shows the double extraction from 1:2 egg yolk-oil mixture. Under the pressure 3,000 psi, 73% of cholesterol was extracted after double extraction, fifteen passes. The 4,000 psi pressure extracted 81% of cholesterol, and 5,000 psi extracted 78% of cholesterol after double extraction. In the higher 1:4 ratio yolk/oil mixture, the single extraction of cholesterol with 3,000 psi was 64% the extraction of cholesterol with 4,000 psi was 83%, and the extraction with 5,000 psi pressure resulted in 73% of cholesterol removal (FIG. 4). Under these conditions, the pressure between 4,000 and 5,000 psi resulted in around 80% cholesterol extraction.

The homogenization pressures higher than 5,000 psi are also advantageously used. Such pressures are particularly useful for pilot plants and for large scale production. The homogenization pressures used for large scale cholesterol extraction from large volumes of the egg yolk are performing best in range from 4,000 psi up to 15,000 psi. However, pressures up to about 21,000 psi are contemplated to be within the scope of this invention and it is to be understood that the high pressure equipment may be able to assert pressure up to and around 21,000 psi.

The yield of the cholesterol extraction from the egg yolk/oil mixture, thus depends on a ratio of the oil/yolk, on homogenization pressure used, on a number of passes within one extraction and on a number of extractions.

The homogenated mixture of egg yolk and oil produced by ultra high pressure homogenization is pumped into and collected in a separator. The separator is a vessel which separates the decholesterolized egg yolk from the vegetable oil containing cholesterol. Any suitable separator is meant to be within the scope of this invention. Separators particularly suitable for the purposes of this invention are preferably continuous and centrifugal type separators such as Westfalia, obtained from Westfalia, Germany or Alpha Laval, Sweden. Typically, the separator is rated at 5 gal/min of homogenate and driven by an electric motor. The centrifuge is typically nozzle discharge type equipped with a center riser type discs. Typically, the homogenate is fed to the separator by a positive displacement pump such as manufactured by Waukeska Pumps or Binks Pumps. This ensures uniform flow which is essential for proper operation of the centrifuge.

The separation of the decholesterolized egg product from the oil-cholesterol mixture is by centrifugation in the separator. The homogenate is centrifuged for 2 to 60 minutes, preferably for 10 minutes, at temperature between 18° and 45° C., preferably at room temperature, at rpm between 2,000 and 10,000 or those most advantageously provided by the separator apparatus. The rpm, time, and temperature conditions vary between different centrifuges and separators and, depending on the combination of these conditions, the percentage of the cholesterol extraction from the egg yolk could also change. In addition to the cholesterol extraction, the egg oil is also removed by this process which thus produces low fat low cholesterol liquid egg yolk.

Two products obtained by homogenization and separation of the egg yolk/oil mixture, i.e. low cholesterol egg yolk and the oil containing extracted cholesterol, are separately transferred into different vessels. The decholesterolized egg yolk is transferred to a collection tank in the collector and either moved back to a holding container and reextracted by going through the same extraction procedure one or more times, or the liquid egg yolk is removed, as seen in FIG. 1, for product processing.

The oil extract containing cholesterol is transferred into steam stripping apparatus or some other equipment suitable for removal of cholesterol from oil and treated with appropriate method to remove cholesterol. Preferred steam stripping method removes 70%–98% of cholesterol from the oil and provides oil purified enough to be reusable for extraction of another batch of the liquid egg yolk.

When the higher degree of cholesterol removal from the egg yolk is desired, the already extracted liquid egg yolk is again mixed with the vegetable oil, as described previously, and the same process is repeated one or more time using the same or modified conditions, as described above. By repeating the cholesterol extraction, up to 99% of cholesterol may be removed and extracted. When desired, the procedure can be repeated several times and even higher removal of cholesterol can be achieved. Most economical cholesterol removal (65–85%) is by using one or two extractions.

The decholesterolized egg yolk is either used as is or it is reconstituted as a whole egg and used in a liquid or dry form or the egg yolk is used as chilled liquid, dried or, freeze-dried egg yolk product.

Reconstitution of the egg yolk with up to twice of the egg albumen further reduces the low cholesterol level remaining in the egg yolk after the extraction by up to 50% of the residue cholesterol due to dilution, without changing egg characteristics and flavor. This mixture can be used to develop imitation egg products which contains 100% egg yolk having low cholesterol and is superior to the yolkless imitations that are currently on the market.

II. Removal of Cholesterol from the Oil—Stage 2

The extraction oil used previously for extraction of cholesterol from the liquid egg yolk and hence containing a substantial amount of cholesterol is submitted to any suitable treatment which would effectively remove cholesterol from the oil, making the oil suitable for recycling. In this process, cholesterol is removed from the oil and separately recovered. As seen in FIG. 1, the purified oil is used for extraction of a new batch of the liquid egg yolk and recovered cholesterol is isolated, purified, concentrated and utilized for production of pharmaceuticals, cosmetics or aquaculture feed.

The methods suitable for oil recovery include, but are not limited to steam stripping, which is preferred, supercritical extraction, saponification, precipitation with β-cyclodextrin and other methods known in the art. See for example U.S. Pat. Nos. 4,996,072 and 4,804,555, and *Lipids in Foods, Chemistry, Biochemistry and Technology*, Ch. 15:130–138 (1980) Pergamon International Library, New York.

Steam stripping process used by the method of this invention which substantially purifies the vegetable oil used for extraction of cholesterol from the egg yolk, is essentially a vacuum steam distillation in which the cholesterol is removed from the relatively non-volatile oil without any damage to the oil nor to the cholesterol.

The steam stripping procedure which is commonly used for deodorization of vegetable oils is a steam distillation under vacuum. At reduced pressures and at elevated temperature, certain compounds, like for example cholesterol, become more volatile, particularly when an inert gas, usually the steam, is introduced in such a way that it intimately contacts the oil.

The steam stripping method for removal of cholesterol from the animal fats is disclosed in the U.S. Pat. Nos. 4,996,072 and 4,804,555, which are herein incorporated by reference. The removal of cholesterol from the buttermilk by steam stripping was previously known. Essentially, the same steam stripping method as used for cholesterol removal from the buttermilk is used in the current invention. Used in this invention, it achieves a high percentage of cholesterol removal from the extraction oil containing cholesterol originally removed from the egg yolk, and provides essentially cholesterol free oil suitable for recycling. The difference between the prior art removal of cholesterol from fish oils, such as, for example, from fish oil is that such oil contains only relatively small amounts of cholesterol while the oil used for extraction of the egg yolk is heavily laden with cholesterol. The amount of cholesterol in the oil used for egg yolk extraction is approximately twice as high as in the fish oil.

Steam stripping thus can be advantageously used for extraction of cholesterol from the cholesterol laden oil and for purification of the oil following the ultra high pressure homogenization and separation of the egg yolk-oil mixture by the procedure described above in Section I, making the method of this invention extremely economical.

The following procedures and conditions described below were tested and developed for steam stripping and are particularly useful for the current invention. The procedure and conditions described therein are suitable for both a small scale and a large scale egg yolk decholesterolization process plants, such as for a mini plant processing up to 20,000 pounds of egg yolk per day, or for large or giant plants processing 200,000 pounds or more of egg yolk per day.

The steam stripping apparatus suitable for purification of the extraction oil is built to meet the basic requirements for removal of cholesterol from the oil. The distillation of cholesterol from oils requires the application of the high temperature, large volumes of distillation steam, and intimate contact between the oil and the distillation steam. The steam stripping distillation column/apparatus is, therefore, designed to withstand temperatures of at least up to 270° C. and both high and low vacuum, while achieving intimate contact between the stripping steam and the oil to promote the removal of cholesterol.

Typically, in practice, as seen in FIG. 1, cholesterol laden oil is transferred from the separator to the steam stripping apparatus, where it is preheated with steam and vacuum stripped in the stripping column. From the steam stripping column, the oil and cholesterol containing distillate are separated. The steam distillate containing cholesterol is moved to a cooled condenser and submitted to condensation and further separated into water and cholesterol residue. Cholesterol residue in water is then transferred into the cold trap under vacuum and the remainder of water is removed, leaving behind the concentrated cholesterol. Residual cholesterol is then submitted to purification as described in Section III. The oil is transferred from the stripping column into heat exchanger, cooled and recycled.

To determine the optimal distillation conditions for cholesterol removal from extraction soybean oil with higher yield and minimum oxidation damage, series of testing was performed.

In these testings, duplicate cholesterol assays before and after each conditions run were performed to determine the percentage of cholesterol in each sample before and after steam stripping. Cholesterol content was determined according to AOAC gas chromatographic methods. Peroxide content to determine the oxidation of the oil was measured by AOCS Method Cd 8-53, a wet chemistry method by titration to starch-iodine endpoint. Color determinations useful for determination of oil quality were made using Lovibond Tintometer with 5.25 inch cell. Color determinations by this method are done by comparison to color standards.

Determination of Optimal Conditions for Steam Stripping

In the first series of experiments, the investigation of optimum conditions for steam stripping of oil-cholesterol mixture varied the temperature, oil feed rate and steam to oil ratio in a branching or fishbone pattern to determine effects on cholesterol removal and oil quality. Temperature was increased in approximately 10° C. increments from 233° C. to 266° C. These conditions were selected based on the earlier testing. Within each temperature increment, oil feed rates were run at 5, 10, and 15 pounds per hour. Steam-to-oil ratios were varied at each temperature and oil rate. Oil abuse, that is its degree of purity, was determined by measuring oxidation as peroxide number and also by color change measurement before and after distillation.

Cholesterol laden soybean oil was used immediately or was stored at 0° C.–41° C. until being processed for cholesterol reduction.

The feasibility of cholesterol removal from the extraction oil was tested and the optimum operating conditions for distillation to remove cholesterol with highest oil yield and minimal oxidative damage were determined. As testing samples, oils containing from about 0.350 to about 1% of cholesterol extracted from the egg yolk by ultra high pressure homogenization, were used. The percentage of cholesterol before and after the steam stripping was determined. Results are shown in Table 2.

Steam stripping under the above shown conditions resulted in a good quality oil suitable for recycling with 0–91% reduction in cholesterol content in the oil following the steam stripping. The results of testing summarized in Table 2 clearly show that, depending on the experimental conditions, 82–91% of cholesterol is removed from the extraction oil without damage to the oil.

Results seen in Table 2 correspond to samples 1–20 after the first pass (extraction oil stripped once), results in the samples 21–24 correspond to the second pass (extraction oil stripped twice) materials. These second pass materials described did not show any significant and measurable cholesterol reduction over the first pass. In this table, stripped once means that the extraction oil containing cholesterol was submitted once to steam stripping, percentage cholesterol was determined, and the oil was used for recycling, that is for cholesterol extraction from the new batch of egg yolk. Twice stripped means that the once stripped oil was submitted again to the second steam stripping without being used for cholesterol extraction from the egg yolk.

Table 2 clearly illustrates that one cycle steam stripping under the conditions as selected and shown in Table 2, is suitable to remove between 82%–91% of cholesterol from the extraction oil. No peroxidase was found to show that oxidation of the oil occurred during the steam stripping. No serious color loss was evident, as seen from the Lovibond testing results, which would signify the oil oxidation or decomposition.

In general, cholesterol removal was favored by higher temperatures up to the point at which oil decomposition begins. It was found that only after raising the temperature above 255° C., some oil damage occurred. Such increased temperature above 255° C. did not increase the cholesterol reduction and thus became unnecessary. The single cycle run at 240°–255° C. temperature was found optimal for removal of cholesterol from the oil. Higher temperatures and re-treatment (second cycle) produced no further reduction in the residual cholesterol level present in the oil after the steam stripping.

A steam-to-oil ratio of 5.3% was adequate to achieve a 90% cholesterol reduction at 255° C. Higher steam ratios produced no increase in the cholesterol removal which indicates that the lower steam ratio was adequate for a maximal cholesterol removal. Lower steam-to-oil ratios are more economical.

Oil feed rates 5, 10, and 15 pounds per hour were tested. There was no significant difference between the 5 and 10 pound per hour trials where the percentage cholesterol reduction was around 90%. At 15 pounds per hour, the cholesterol reduction fell to about 87%. The oil feeds between 5–10 pounds per hour were thus sufficient to achieve high cholesterol removal.

The maximal cholesterol extraction is clearly dependent on the combination of temperature, flow rate of the oil feed, and percentage of steam used. For the purpose of the maximal cholesterol removal from extraction oil, the optimal conditions were fixed at 255° C., 5.3% steam and oil feed rate of 10 pounds per hour.

Determination of Quality of the Oil Following Multiple Recycling Cycles

The next series of experiments focused on the purity and quality of the soybean oil following the multiple recycling cycles. These experiments tested the effects of recycling of the extraction soybean oil on the cholesterol extraction efficiency as well as on the oil quality.

The first series of experiments determined the general conditions for cholesterol removal by steam stripping with feed temperature of 255° C., oil feed rate of 10 lbs per hour (4.6 kg per hour), stripping steam rate 5 to 6% of the feed rate, and an overall process pressure of 1.0 mmHg. These conditions determined minimum amount of steam needed to effectively remove the maximum percentage of cholesterol. Minimum steam consumption during stripping is essential to minimize manufacturing costs.

The above determined optimal conditions were used to remove cholesterol from the soybean oil after each pass. Cholesterol levels were measured before and after each stripping pass. The generally acceptable Lovibond color analyses were also performed on extraction oil and stripped oil. Lovibond color test follows the change of the yellow and the red color of the oil. It was observed that the oil color became darker (more red) with every recycling cycle. The degree of darkness was used as an indicator that there are oxidation products present and that complete change of oil or filtration is necessary.

In these experiments, the prepared samples were each run through the steam stripping on the days they were produced, that is immediately after the ultra high pressure homogenization was performed. To test the feasibility of recycling of the extraction oil, the first cholesterol laden oil was virgin soybean oil used for extraction of cholesterol from the egg yolk. The cholesterol laden oil was steam stripped. The stripped oil samples were mixed with the egg yolk and ran again through the ultra high pressure homogenization extraction process to extract cholesterol from the liquid egg yolk. The yolk and oil were separated by centrifugation. The cholesterol-laden oil was passed through steam stripping a second time. The recycling process was continued in the same way through six cycles. On each additional cycle, approximately 10%, by weight, fresh soybean oil was added to the steam stripped oil to replenish process losses that arise from oil handling and distillation.

A total of six cycles, that is six egg yolk extractions and six steam strippings, of which five were recycles of one batch, were run. Table 3 illustrates cholesterol content in recycled extraction oil before and after steam stripping (five recycles, six extractions).

Lovibond color scale utilizes (Y) yellow, and (R) red colors to identify oil purity. When red goes from 0.3 to 3, the oil is more contaminated.

The extraction oil in each cycle was the one used for cholesterol extraction from the egg yolk/oil mixture (1:2). The oil used in the first cycle was fresh oil used for the first time for the extraction of cholesterol from the liquid egg yolk. The percentage of cholesterol in the oil after the first cycle was determined to be 0.371%. This oil was then submitted to steam stripping and 90% of cholesterol was removed from the oil, resulting in remaining 0.036% of cholesterol residue in the steam stripped oil. This oil was then recycled for the second time for extraction of cholesterol from the liquid egg yolk. The first time recycled oil, that is after the second time extraction, contained 0.370% cholesterol from the egg yolk and the steam stripping again removed 90% of cholesterol from the extraction oil. The residue of cholesterol remaining in the recycled oil was 0.038%. In the second recycling cycle, that is after the third time cholesterol extraction from the yolk, the oil contained 0.450% of cholesterol. This amount was reduced to 0.059% of cholesterol residue after steam stripping, that is 87% of cholesterol was removed from the extraction oil. After six extraction cycles, that is after five recyclings, the same recycled oil was still able to extract the same amount of cholesterol from the egg yolk, that is between 70%–98%. With steam stripping and purification of the extraction oil around 83% of the cholesterol was removed from the oil. After six cycles, no major changes were observed in the oil. The recycling was continued for 10 or more times.

Figure 6:
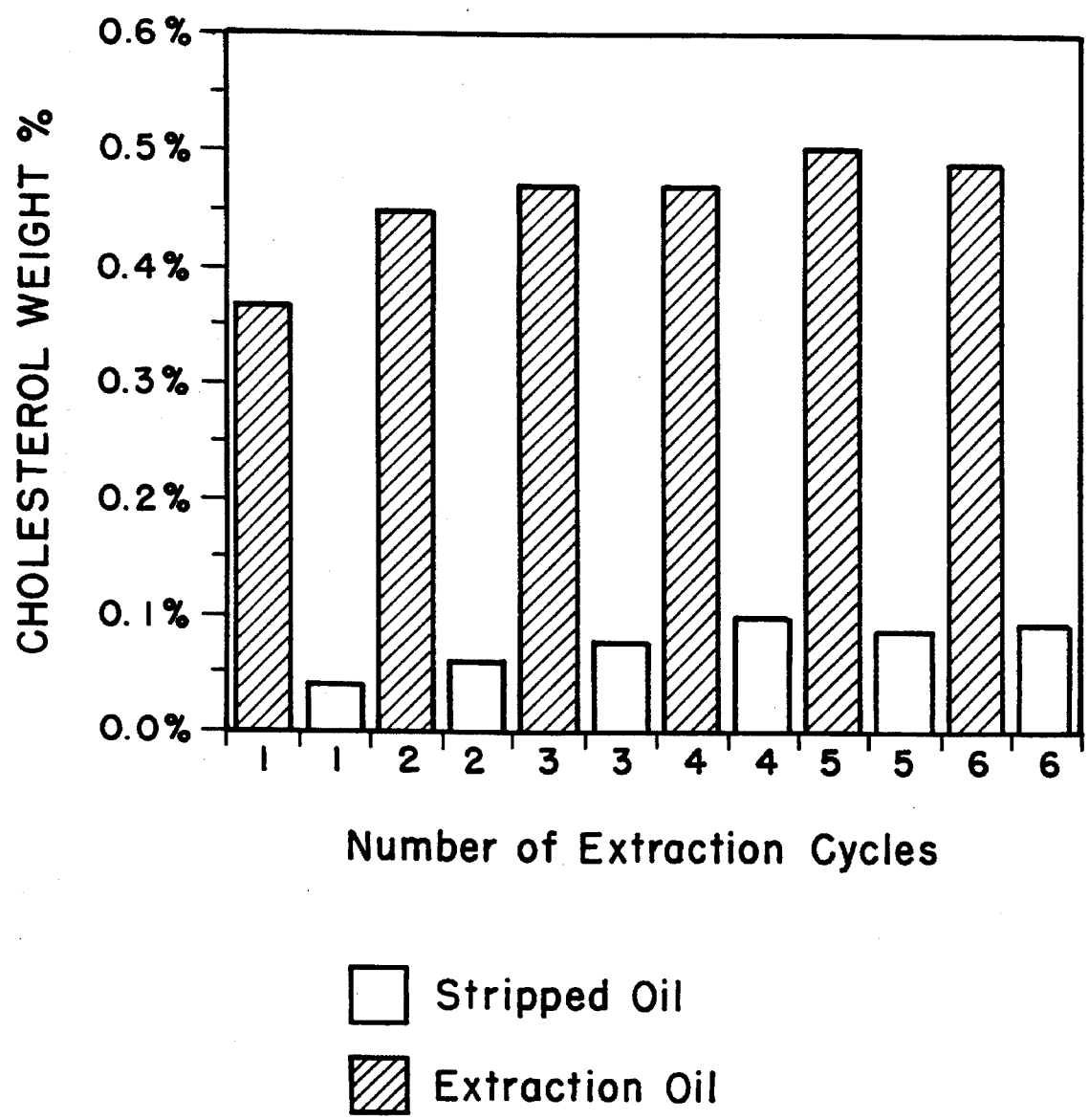
FIG. 6 illustrates the weight percent of cholesterol content present in the extraction oil after extraction from the egg yolk and in the same oil treated with steam stripping method.

The steam stripping method was able to remove 80%–90% of cholesterol from the oil, making the oil suitable for recycling and reuse for up to 10 cycles. That is, the same oil could be reused for seven to eleven cycles of cholesterol extraction from the egg yolk. Reduction of cholesterol was plotted for each of the cycles in FIG. 6. This Figure shows a 90% reduction of cholesterol on cycle one, then dropping continuously to 80% reduction for cycle four and leveling out at about 82% and 81% for cycles five and six. The cholesterol reduction in the oil means the percentage of cholesterol removal from the extraction oil by steam stripping.

Cholesterol content found in the oil after the extraction of egg yolk was between 0.37%–0.49% level in all six recycling cycles. The cholesterol level in the stripped oil rose slightly after each cycle, from 0.038% after the first cycle to approximately 0.090% after the sixth cycle. This residual cholesterol may be esterified cholesterol which is less likely to be removed by distillation.

The first series of experiments determined the general conditions for cholesterol removal by steam stripping with feed temperature of 255° C., oil feed rate of 10 lbs per hour (4.6 kg per hour), stripping steam rate 5% to 6% of the feed rate, and an overall process pressure of around 1.0 mmhg. These conditions determined minimum amount of steam needed to effectively remove the maximum percentage of cholesterol. Minimum steam consumption during stripping is essential to minimizing manufacturing costs.

The above determined optimal conditions were used to remove cholesterol from the soybean oil after each cycle. "Cycle," as used herein, means removal of cholesterol from the liquid egg yolk into oil and removal of cholesterol from the oil by steam stripping. Second, third, etc., cycle means once or twice recycled oil used for removal of cholesterol. Cholesterol levels were measured before and after each steam stripping.

The generally recognized Lovibond color analyses showing the presence of oxidation products were performed on both the extraction oil and on the stripped oil. Lovibond color test follows the change of the yellow and the red color of the oil. The oil normally gets darker (more red) with every recycling and its darkness is used as an indicator that a complete change or filtration is necessary.

Peroxide analyses were performed on both the extraction oil and the stripped oil for each cycle. Drop in the peroxide level was observed in some samples after the extraction oil was run through the steam stripping as the process is known to remove oxidized oil and peroxides. These results indicated that it is best to process the extraction oil as soon as possible to prevent a build-up of peroxides, and/or keep the oil under refrigeration until steam stripped. However, if such peroxidases do accumulate in the extraction oil, it is possible to purify the extraction oil by the steam stripping process.

There was small, approximately 1%–5% loss of oil volume observed after each extraction and steam stripping due to handling and transportation. For each new cycle of the stripped oil, therefore, approximately 1%–5% of fresh oil was added. The oil was completely changed after 10–20 cycles, or as needed.

The second series, which tested the effect of the recycling of the oil on the efficiency of cholesterol extraction and on the quality of the oil, indicated that soybean oil can be successfully used for recycling if it is purified by the steam stripping. The use of recycled oil had no effect on the adverse sensory characteristics of the egg yolks.

After the steam stripping, oil purified by steam stripping is returned to the container holding the oil and moved to the ultra high pressure homogenizer together with the new batch of liquid egg yolk and the cholesterol extraction is repeated.

III. Removal of Cholesterol from Oil—Stage 3

Cholesterol was separated from the steam distillate, concentrated, isolated, and purified according to process outlined in FIG. 1.

During the steam stripping of the extraction oil, the hot steam distillate shears the oil under vacuum, thereby removing from the oil volatile compounds, such as cholesterol. Cholesterol is carried by the steam distillate into a condensation column where the steam distillate is collected and condensed into water. Cholesterol is very soluble in water and consequently it precipitates and solidifies into a cholesterol residue. As the steam distillate is condensing into water, the water passes through the cold trap where cholesterol is deposited. This cholesterol is removed and purified to required purity.

As seen in FIG. 1, after the steam stripping step the oil is separated from a steam distillate carrying cholesterol. The steam distillate containing cholesterol was diverted to the condenser where the steam distillate was cooled down and condensed into water. Since the cholesterol is only slightly soluble in water, it was easily separated from the condensed steam fraction following steam stripping. In the steam distillate, the cholesterol began to precipitate and solidify. When water was moved to a cold trap, from which it was removed under vacuum, it left behind a solid non-esterified cholesterol. It was observed that a certain amount of cholesterol was accumulated outside of the trap. Cholesterol accumulated in the trap was either used as is or further purified by, for example, flushing with oil to make about 5% cholesterol/oil solution and further isolated and solidified from the oil.

Purification of the cholesterol was done by methods known in the art, such as those referenced below.

Purification of cholesterol was achieved by, for example, repeated bromination according to *J. Biol., Chem.*, 105:355 (1934). Similarly, the isolation and purification of the cholesterol resulting from steam stripping is also conveniently performed according to method disclosed in the U.S. Pat. No. 4,762,792, incorporated herein by reference. Cholesterol is concentrated using method described in U.S. Pat. Nos. 4,374,776, 4,183,852, 4,183,847, incorporated herein by reference.

The cholesterol extracted from the egg yolk by this method is useful as an emulsifying agent, for formation of, for example, cholic acid, bile, to prepare adrenal, and sex hormones, vitamin D, contraceptives and steroids, or for preparation of various cosmetic preparations for protection of skin from cholesterol esters.

Cholesterol is also in demand as food for shrimp and other seafood grown in aquaculture, as well as for fish. Shrimp and other seafood cannot synthesize cholesterol. Aquaculture feed is made from grains and fish paste and therefore, does not contains sufficient amount of cholesterol to meet the nutritional requirement of these creatures. Therefore, adding cholesterol to the feed results in faster and better growth of the shrimps and other seafood.

The isolation of cholesterol from the steam distillate provides non-esterified cholesterol suitable for commercial use following the purification by methods known in the art and described above.

IV. Evaluation of Decholesterolized Egg Yolk

A. Chemical Evaluation

The first product of this process, the egg yolk having removed 70–95% of cholesterol has been evaluated by generally acceptable methods for sensory, performances in product evaluation and by chemical analysis. The experimental set-up for chemical, sensory, and evaluation in products are described in Examples 2–5.

In the process of cholesterol extraction from eggs, it was found from previous observations that some other egg components are being simultaneously removed with the cholesterol as seen in Table 4.

Table 4 illustrates loss of vitamin A naturally occurring in the egg yolk during the one-two stages oil extraction according to the current invention. As can be seen, cholesterol is removed in around 92.7%. Similarly, the oil soluble vitamin A is almost completely (94.7%) extracted into the oil.

Since, however, the loss of some of the components could conceivably change the taste, functionality or texture of the egg yolk, reconstituted egg, or the egg products, the procedure was designed to evaluate the magnitude of these changes. Criteria, such as percentage reduction of moisture, protein, carbohydrates, fat, ash, calories, calories derived from total and from saturated fat, saturated, monounsaturated and polyunsaturated fatty acids were followed and compared in the regular yolk and in the decholesterolized egg yolk as well as in the extraction oil. The results are seen in Tables 5–7.

Table 5 compares the regular yolk with the reduced cholesterol egg yolk where the cholesterol was reduced by 87%.

As seen from the Table 5, the fat content, calories, and the amount of saturated and monounsaturated fatty acid were all decreased. Protein, and carbohydrate content was, on the other hand, increased. The decholesterolized egg yolk thus provides healthier, more nutritious food compared to normal regular egg yolk.

By studying the same criteria in the decholesterolized egg with single extraction using recycled oil, as seen in Table 6, the obtained results were similar.

Table 6 shows the presence of nutrient components present in regular and cholesterol reduced egg yolk after one, three or six recycles.

After single extraction, fats and calories were both reduced. There was some moisture increase, probably due to the remainder of the water in recycled oil following steam stripping. However, one single oil extraction with one, three, or six times recycled oil resulted in 67–71% of cholesterol reduction with substantially unchanged protein content, with increased carbohydrate content and with substantially decreased fat content.

The recycling of extraction oil thus affords the substantial cholesterol extraction without causing any harm to the nutrient content of the egg yolk. Again, the extraction process resulted in the egg yolk having 67%–71% less cholesterol, only three-quarters of the calories and a substantially decreased amount of fat. The percentage of cholesterol extraction in one single egg yolk batch, of course, would increase upon repeated second or third extraction of the egg yolk.

B. Product and Sensory Evaluation

Following the chemical evaluation, the product and sensory evaluations were also performed. The functional performance of the low cholesterol egg yolk was determined with the cake height test and with the cream puff test. Both these tests are indicator of the leavening ability of egg proteins.

Procedures used for such evaluation are set-up in Examples 4 and 5. The product evaluation included evaluation of sponge cake made from regular whole eggs and those having the 63% extraction into the vegetable oil according to this invention. Results seen in Table 7, which were obtained from the egg yolk submitted to the double extraction having 87% of cholesterol removed, show that both cake volume and cake height were almost the same for both types of eggs.

As seen in Table 7, both the regular eggs and the reduced cholesterol eggs sponge cake had the same height with the cake volume only slightly (around 3%) smaller in the reduced cholesterol eggs cake.

The cakes evaluated in Table 8 were made of decholesterolized eggs having 63%–68% reduced cholesterol after single extraction with recycled oil.

The sponge cakes prepared from the eggs submitted to single vegetable oil extraction (63–68% cholesterol reduction) with one or six times recycled oil, as seen in Table 8, have approximately one quarter lesser volume than cakes made from the regular and twice extracted egg yolk. However, there was no difference between cake made from decholesterolized egg extracted with six times recycled oil.

Since there was slight decrease in the decholesterolized cake's height and volume after the extraction with recycled oil, the modified formula for sponge cake seen in Table 9 was tested.

This modified formula had almost the same volume and height as seen in cakes made of regular whole eggs.

The sponge cakes and other egg preparations were also tested for sensory perception. The purpose of these studies was to determine the effect of the cholesterol extraction process on the sensory properties of the decholesterolized egg yolks when used for preparation of some common food products made from eggs such as scrambled eggs, sponge cake, and mayonnaise. By doing preliminary sensory evaluation experiments using consumers as judges, the acceptability of products made from the reduced cholesterol eggs was assessed while any changes in the flavor, texture, and appearance of these food products were also observed in these evaluation studies. As the low cost vegetable oil was used for extraction of cholesterol, it was of interest to note any change in sensory quality of reduced cholesterol eggs when the recycled oil was used as the extraction medium. In this series of experiments, attempts were made to find out if reduced cholesterol eggs extracted with the fresh non-recycled oil and with the recycled oil were equally acceptable to consumers.

Mayonnaise-Regular Eggs vs. Reduced Cholesterol Eggs

Fifty-two judges tested their preference and ability to tell the difference between a mayonnaise made from regular egg yolk and a mayonnaise made form reduced-cholesterol egg yolk. Eleven judges demonstrated an ability to tell the difference. The preference of these 11 judges for the two types of mayonnaise were not significantly different. Five judges preferred mayonnaise made of regular egg yolks, four judges preferred reduced-cholesterol mayonnaise, and two had no preference. Among all the judges tested, 17 preferred regular mayonnaise, 18 preferred reduced-cholesterol mayonnaise and 17 had no preference; the difference in their preference responses were not significantly different. Among all 52 judges, 17 judges preferred regular mayonnaise while 35 did not prefer regular mayonnaise (either preferred reduced cholesterol mayonnaise or have no preference). The difference between these two responses was significant at $P<0.02$, as seen in Table 10.

Sponge Cake Regular Eggs vs. Reduced-Cholesterol Eggs

Forty-eight judges participated in the preference and difference tests on sponge cakes made from ordinary eggs and reduced-cholesterol eggs. Fourteen judges demonstrated ability to tell differences between the two cakes. Their preferences were significantly different at P<0.01. Among those 14 judges, ten preferred regular sponge cake, four preferred reduced-cholesterol sponge cake. The difference in the number of judges who preferred regular sponge cake (10) vs. four judges who did not prefer regular sponge cake, was not significant. Referring to data reported by all 48 judges, their preference/no preference were significantly different at P<0.01, with 24 preferring regular sponge cake, 18 preferring reduced-cholesterol sponge cake and with six having no preference. However, there was no difference in the number of judges who preferred regular cake (24) and the number of judges who did not prefer regular cake in particular (24), as seen in Table 11.

Sponge Cake-Reduced Cholesterol Eggs Extracted with Fresh Oil vs. Five Times Recycled Oil Fifty-seven judges participated in the preference and difference tests on sponge cakes made from two different batches of cholesterol-extracted eggs using 1st cycle (fresh) and 6th cycle oil (recycled and 5-times steam-stripped). Eleven judges demonstrated ability to tell differences. The preference/no preference responses of these 11 judges were not significantly different. Of the eleven judges, two preferred 1st cycle sponge cake, seven preferred 6th cycle sponge cake, and two had no preference. The number of judges who preferred 1st cycle sponge cake (2) and the number of judges who did not prefer 1st cycle sponge cake in particular (9) was significantly different. Among all the judges, 15 preferred 1st cycle sponge cake, 21 preferred 6th cycle sponge cake, and 21 had no preference; the preference/no preference data were not significantly different. The number of judges who preferred 1st cycle sponge cake (15) and the number of those who did not prefer 1st cycle sponge cake (42) in particular, was significantly different at P<0.001 as seen in Table 12.

Scrambled Cholesterol Reduced Eggs Extracted with Fresh Oil vs. Five Times Recycled Oil Among the 56 judges who participated in the preference and difference tests, 15 demonstrated an ability to tell the difference between scrambled eggs prepared from reduced cholesterol egg yolk and those prepared from regular egg yolks. From these 15 judges, three preferred scrambled egg yolks extracted with oil recycled one time, three preferred scrambled eggs yolks extracted with oil recycled six times, and nine had no preference. The difference in their preference/no preference response was not significantly different. Among all 56 judges, three judges preferred scrambled eggs made of yolk extracted with fresh oil, while 12 had no preference. The difference in these two responses was significantly different. The difference in preference/no preference response of all the judges was close to significant at P<0.005, with 14 preferring scrambled eggs made of yolk extracted with fresh oil, 15 preferring eggs extracted with five times recycled oil; and 27 having no preference.

The results obtained from all performed sensory tests showed that reduced-cholesterol eggs were not rejected by consumers. The use of recycled (steam-stripped) oil to extract cholesterol from the egg yolk seemed to be highly feasible in terms of its effects on the sensory qualities of the egg products. Certain products (e.g. sponge cake) made from recycled oil (5×steam-stripped) extracted eggs happened to show the trend of being more preferable than the same product made from fresh oil-extracted eggs.

The product obtained by the method of the current invention thus show excellent properties welcomed by health-minded consumer. The decholesterolized eggs according to this invention have between 63%–95% of cholesterol and fats removed without significant change in the sensory perception by the consumer and without significant decrease in the product properties. Such product is thus much healthier than the regular eggs containing large amounts of cholesterol.

UTILITY

The method of this invention represents a completely new and highly economical approach to the problem of removing cholesterol from the egg yolk and utilizing removed cholesterol as a by-product.

The method which consist of several steps ultimately produces two industrially important products, namely low cholesterol egg yolk and substantially concentrated and pure cholesterol. Moreover, the edible oil used for cholesterol extraction by removal of cholesterol by-product, is made recyclable. The method, in particular ultra high pressure homogenization extraction is technologically feasible, economical, and industrially acceptable with the extraction of cholesterol from the egg yolk reaching 65%–90% and with cholesterol by-product production approximately a hundred times cheaper than other known processes for production of cholesterol. The method preserves egg yolk properties, such as the taste and texture, egg integrity, eliminates freeze drying steps and pH adjustment, minimizes the differences between oils of different vegetable origin and between levels of unsaturated fatty acids. The method is safe, easy, fast, simple, relatively industrially undemanding, very economical, and very suitable for large scale processing.

The reduced cholesterol egg yolk according to the current invention has many attractive properties. It has low content of cholesterol and fats, particularly the saturated fats, it is low in calories and has high protein and carbohydrate content. Its sensory evaluation shows that it is comparable in flavor and appearance to the regular egg yolk. It can be preserved either as chilled liquid egg yolk, or frozen or dry egg powder.

The low ratio of egg yolk to oil from 1:0.5–4 preferably 1:2, of egg yolk to oil, combined with the multiple recycling of the extraction oil following the steam stripping results in extraordinary savings due to a small volume of recyclable oil needed for the cholesterol extraction.

Cholesterol produced by the current invention as the by-product is a high quality low cost product. Normally, one pound of purified cholesterol produced by other methods costs between $28–$60/lb. The cost of one pound of cholesterol obtained as the egg decholesterolization by-product is as much as 100 times lower.

The method for producing both products resulting from this method utilizes series of steps which shorten the time of extraction from 1.5 hour or longer per one extraction to 2–10 minutes. No freeze-drying, pH adjustment or other pretreatments are necessary for the egg yolks. The oil into which cholesterol is extracted is the most common and most inexpensive vegetable oil in the market, namely soybean oil.

The recycling of the extraction oil does not present serious problems for egg yolk quality. The sensory evaluation of the egg yolk remains good even after six recycling cycles. The cholesterol extraction efficiency, as measured by residual cholesterol in the egg yolk, is only marginally affected by recycling. The functionality of eggs is not changed.

Small plant scale-up designs for decholesterolization of the egg yolk and for steam stripping of 20,000 lb.; i.e. 45,000 dozen egg yolk per day processing facility correspond directly to scaled laboratory conditions. A 200,000/lb., i.e. 450,000 dozens of egg yolk per day facility would require several homogenization units and separators, as well as multiple distillation columns.

Although during the steam stripping process, certain amount of oil is lost, the lost amount is usually in 1%–5% region. Such loss does not have critical impact since the used oil is inexpensive and recyclable. The lost volume of the steam stripped oil used for recycling is easily made up with fresh oil. Despite the need to replenish approximately 1%–5% of the oil amount, savings achieved by low volumes of oil needed, and by the purification of the oil for recycling are substantial.

Storage life of both decholesterolized egg yolk and the recycled oil is generally good. As a rule, vegetable oil such as the soybean oil is very stable against oxidation due to the presence of naturally occurring antioxidants known as tocopherols.

In the case when the oil for recycling is to be transported, it is transported at low temperature, around 4° C. and/or antioxidant tocopherols are added.

The apparatus for practicing this invention is not exceedingly complicated and can be easily modified to accommodate small, medium size, and large egg processing plants. In its most advanced form it is fully automated, thus further eliminating a cost of labor.

These and other features of the current invention are illustrated in the examples. The examples should not be interpreted in any way to limit the scope of the current invention.

EXAMPLE 1

Ultra High Pressure Homogenization of the Egg Yolk-Oil Mixture

This example illustrates the cholesterol extraction into edible oil by ultra high pressure homogenization.

Before extraction, yolk cholesterol level was determined by AOAC, (1984) California Department of Food and Drug (CDFA 1989) and by enzymatic method to be 12.7 mg/g.

One hundred grams of liquid egg yolk containing 1,270 mg of cholesterol and 200 grams of soybean oil were combined in a ratio 1:2 in a mixer and slightly mixed. The mix was introduced into ultra high pressure homogenizer Microfluidizer 5,000 or modified Binks airless system. Microfluidizer 5,000 under vacuum was equipped with six holding containers and one homogenization head to allow six passes of the emulsion through the homogenizer. The mixture was subjected to homogenization at a pressure of 8,000 psi for 1–2 minutes for each pass with throughput capacity of 900 ml/min. Following the homogenization, the egg yolk and the cholesterol laden oil fraction were transferred to a separator and separated by centrifugation at 5,000 rpm. The centrifugation in the separator separated the decholesterolized liquid egg yolk fraction and the oil fraction containing extracted cholesterol. Liquid egg yolk remained as the lower fraction, the oil formed the upper fraction.

The decholesterolized egg yolk was directed to a cooled egg yolk container where the samples of the egg yolk were removed to determine the amount of cholesterol remaining in the egg yolks. The first extraction in this experiment removed approximately 67% of cholesterol.

The cholesterol extracted to oil was found to be around 8.1 mg/g. The cholesterol extraction from the egg yolk was thus 810 mg/100 g. The process was repeated by mixing the yolk with new batch of oil and after a second homogenization and centrifugation, the amount of removed cholesterol from the liquid egg yolk increased to 84%. After the third extraction cycle, the amount of removed cholesterol from the liquid egg yolk increased to about 90%. The residue of cholesterol in the liquid egg yolk after the third extraction was 1.28 mg/g., that is about 10%.

After the extraction, the low cholesterol egg yolk was ready to be further processed into chilled, frozen, dried, or freeze dried products. The egg yolk obtained in this example was chemically analyzed and evaluated. Functional properties were evaluated through preparation of mayonnaise, sponge cake, and scrambled eggs according to Examples 2–8.

Extraction oil containing approximately 90% of cholesterol removed from the liquid egg yolk was transferred from the separator (upper phase) to the steam stripping apparatus. The cholesterol content in the extraction oil was determined to be 810 mg/100 g. First, the oil was preheated with steam to 255° C. in the steam stripping column, then vacuum and the steam were applied. At 255° C., 5.3% steam was applied under flow rate 10 lbs./hour. Under these condition, 90% of the cholesterol present in the oil after the egg yolk extraction was removed in the first cycle of oil treated with steam stripping (see Table 2, Sample 8) under vacuum.

Stripped oil was cooled in the cooling vessel and collected in the product vessel. In this case, the product was the extraction oil steam stripped of the cholesterol originally extracted from the liquid egg yolk.

A small amount of the oil was removed from the product vessel and the content of the remaining cholesterol was determined by the method referenced above. The purity of the oil was tested by determination of the presence of peroxides.

The steam stripped oil in this experiment contained only about 82 mg/100 g of cholesterol, that is around 10%. There was 90% of cholesterol removed after the steam stripping. The volume of the oil was reduced from original 200 g to about 189 g. The loss of about 5% of oil was observed.

The oil volume was made up to 200 g and the oil was transferred to a container holding oil prior to mixing it with another batch of 100 g of liquid egg yolk.

In the same manner as described above, the oil was recycled, that is reused for six additional extractions. In the first recycling, the reduction of cholesterol from the oil by steam stripping again reached 90%. Upon second, third, fourth, fifth and sixth recycling, the amount of cholesterol removed was 87%, 84%, 80%, 83% and 83%, respectively. The quality of the oil deteriorated only slightly during these repurifications by steam stripping. The color of the oil has darkened from slightly yellow to dark yellow or red. There were traces of peroxides present after the third steam stripping cycle.

The steam distillate carrying removed cholesterol removed from the oil by steam stripping was directed, under vacuum, to a condensation column cooled with external water cooling. The condenser had a distillate vessel located under the condenser. Condensed water dripped into the distillate vessel. Cholesterol which, upon cooling of the steam, began to solidify was carried by the vacuum into a cold trap where it accumulated. The accumulated cholesterol was dried and its amount determined to be around 612 mg. Certain residual amount of cholesterol was present in the condensed water and also in the tubing connecting the condenser to the cold trap.

EXAMPLE 2

Product Evaluation of Decholesterolized Egg Yolk

This example illustrates a product evaluation of the egg yolk having 70%–95% of cholesterol removed by oil extraction.

Product evaluation included scrambled eggs formula comparing whole eggs with reconstituted egg having the cholesterol removed by the oil extraction. Mayonnaise formula compared the unprocessed, that is an intact egg yolk, with the decholesterolized egg yolk. The mayonnaise contained the following ingredients: yolk or decholesterolized yolk, 5.56%; vinegar, 10.10%; sugar, 1.52%; mustard, 0.51%; and soybean oil, 82.32%.

Sponge cake made from regular whole eggs was evaluated against 87% cholesterol reduced whole eggs, against 63%–68% reduced cholesterol whole eggs extracted with recycled oil, and from reduced cholesterol eggs with modified sponge formula shown in Table 9.

Sponge cakes were made in two separate batches of batter mixed for each treatment and 75 g or 100 g of batter was weighed into rectangular pans (21.5×11.5×6.5 cm, id.). Cakes were baked at 191° C. for 25 minutes, inverted on a wire rack and allowed to stand at room temperature overnight. Heights were determined from the mean of four measurements along the center line of the long axis of the cake. Volumes were determined from the baking pans volume and height. Cakes were then kept in plastic bags for further rheological evaluations.

Batter weight, cake volume and cake height were determined. Results are shown in Tables 7–8.

EXAMPLE 3

Sensory Evaluation of Various Food Products Prepared from Reduced-Cholesterol and Regular Egg This example illustrates the comparative sensory evaluation by volunteers of products derived from the regular eggs and from decholesterolized egg using the oil extraction method of the current invention.

A. Preparation of Food Products

The cooking conditions, ingredients and methods for three food products-mayonnaise, scrambled eggs, and sponge cake were modifications of USDA and other formulas to stimulate commercial products. Decisions were based on observations from preliminary trials. An important criterion in formulating these recipes was to reduce any external effect on the flavor, texture, and appearance of the product to a minimum such that the chance of any difference between the reduced-cholesterol and regular eggs or between two different cholesterol-extracted eggs being masked by other factors would be small. Also very important was to keep the preparation procedures of egg products consistent throughout the tests.

B. Sensory Methodology

Ordinary consumers were recruited as judges. Each judge performed a preference test followed by a difference test. In preference tests, the method of paired-preference was used in which a judge indicated his preference for either sample or whether he had no preference (meaning both samples were liked equally). To determine whether judges could actually distinguish the two food samples, dual standard tests were performed. Here, judges were asked to match blind samples with the two samples that had been used in the preference test. The number of correct matchings was recorded and checked for level of significance. Preference data interpreted in the light of judges performance on difference tests.

EXAMPLE 4

Preparation of Chilled and Frozen Liquid Yolk and Liquid Whole Egg Products

This example illustrates preparation of low cholesterol chilled or frozen egg yolk or reconstituted whole dried egg products.

Chilled or frozen egg products are available in the market in many forms. Among them are whole egg, salt whole egg (2% or more added salt), sugar whole egg (2%–12% added sugar), plain yolk, salt yolk, and sugar yolk. The sugar and the salt are used for increased shelf life, preserve stability and egg characteristics for frozen products and alter coagulation temperature. Low cholesterol version could be prepared in the same way. Low cholesterol yolk is mixed with the appropriated amount of salt or sugar (not less than 2%) and with 1:2 yolk to egg white when low cholesterol whole egg product is needed. The products are pasteurized at:

whole egg—60° C. for 3.5 minutes;

salted whole egg—63° C. for 3.5 minutes;

sugar whole egg—61° C. for 3.5 minutes;

plain yolk—61° C. for 3.5 minutes;

sugar yolk—63° C. for 3.5 minutes;

salt yolk—63° C. for 3.5 minutes.

The products are immediately cooled down to 3°–5° C. by icy water packaged into suitable containers and being frozen by direct contact or air blast method from –40° to –20° F. Chilled product was kept at 21°–32° F.

EXAMPLE 5

Preparation of Dried Egg Yolk and Dried Whole Egg

This example illustrates preparation of low cholesterol dried egg yolk or reconstituted whole egg products.

Low cholesterol liquid yolk and low cholesterol liquid whole egg are prepared according to Examples 1. In order to produce dried egg powder and dried egg yolk powder, the preliminary removal of glucose is essential as glucose interact with proteins at high temperatures resulting in change of color, and flavor and in other changes in product characteristics. Glucose oxidase is employed to reduce glucose content in the egg before drying step by fermenting the liquid with a culture of streptococcus. If egg white is fermented, the pH is adjusted to 6.0, but no adjustment is needed in yolk fermentation. The temperature of the process is kept at 30°–33° C. The liquid egg is then concentrated to 60% solids by vacuum evaporation and dried by spray drying method. The egg yolk or whole egg liquids are atomized in pressurized nozzle under 500–6000 psi and the drying air is circulating at 155°–177° C. Yolk containing dry product should be kept under refrigeration for larger shelf life period.

EXAMPLE 6

Preparation of Low Cholesterol Scrambled Egg Mix

This example illustrates preparation of low cholesterol scrambled egg mix.

Scrambled egg mix was prepared by using the USDA formula shown below using low cholesterol whole egg either in liquid or in dry form.

| INGREDIENT | LIQUID PRODUCT (%) | DRY PRODUCT (%) |
|---|---|---|
| Low cholesterol - whole egg | 66.3 | — |
| Low cholesterol - dried whole egg | | 12.1 |
| Non-fat dry milk | 9.6 | 10.0 |
| Vegetable oil | 4.8 | 5.0 |
| Salt | 0.3 | 0.3 |
| Water | 19.0 | 67.6 | pH of the mix was adjusted to 6.6–7.0 by citric or lactic acids. The liquid product was kept in chilled or frozen state. The dry formula was kept in air tight package and wetted just before preparation. Both the taste and texture of the scrambled eggs were found acceptable to consumers.

EXAMPLE 7

Preparation of Further Reduced Cholesterol Egg Substitute

This example illustrates a preparation of further reduced cholesterol egg product and compared to no cholesterol egg product.

Low cholesterol egg yolk is prepared according to Example 1. Non-cholesterol egg substitute is made from egg whites with additional food ingredients such as soybean oil or cartenoids and emulsifiers to replace the egg yolk. Non-cholesterol products were prepared as dry mix, chilled or frozen liquid. Palatability and functionality of these products generally found to be poor.

The eggs having further reduced cholesterol level in egg yolk extracted with oil were made by reconstituted of the egg yolk with egg whites in a ratio of 1:3–1:4 instead of the natural ratio of 1:2 that exist in eggs. The egg palatability and functionality of these products were well retained even where cholesterol level was further reduced from 95% to 97.5%. Further reduced egg product was preferable to no-cholesterol no egg yolk containing substitute.

EXAMPLE 8

Low Cholesterol Mayonnaise and Salad Dressing

This example illustrates preparation of low cholesterol mayonnaise and salad dressing.

Low cholesterol egg yolk is prepared according to Example 1. Mayonnaise and salad dressing are semi solid acidified foods. Both were prepared from vegetable oil, egg yolk, acidifying agent such as citric and lemon juice. Salt, sweeteners, spices, flavors, MSG, etc., were optionally added ingredients. Low cholesterol mayonnaise was prepared by mixing the low cholesterol egg yolk with vegetable oil (1:4) and other ingredient were slowly added. The product retained palatability and characteristics of real mayonnaise and was found to be equally acceptable to consumers as was a real mayonnaise.

EXAMPLE 9

Preparation of Low Fat, Low Cholesterol Egg Products

This example illustrates preparation of low fat, low cholesterol egg products.

Low cholesterol egg yolk was prepared according to Example 1. By increasing centrifuge speed to 7,000–8,000 rpm to 4–6 minutes during the centrifugation step of the oil extraction, up to 30% of the yolk oil was also separated.

Using this step modification, up to one-third of the total egg lipids was removed by mechanical means without affecting the palatability and the functionality of the product.

TABLE 1

Effect of Oil Type on Cholesterol Reduction

| Oil Type | % Reduction |
|---|---|
| Sunflower | 76.1 |
| Corn | 76.3 |
| Safflower | 80.3 |
| Canola | 81.1 |
| Soybean | 86.2 |
| Peanut | 88.4 |

TABLE 2

Optimization of Removal of Cholesterol from Extraction Oil

| | PROCESS TEMP | FLOW RATE | % STEAM | % CHOL. REDUCTION | PEROXIDES | LOVIBOND |
|---|---|---|---|---|---|---|
| 1 | 255° C. | 10 lbs/hr | 5.6 | 90 | 0.00 | |
| 2 | 255° C. | 10 lbs/hr | 7.3 | 89 | 0.00 | 11Y 1.0R |
| 3 | 266° C. | 10 lbs/hr | 7.8 | 91 | 0.00 | |
| 4 | 266° C. | 10 lbs/hr | 5.6 | 91 | 0.00 | 7Y 1.0R |
| 5 | 244° C. | 10 lbs/hr | 6.2 | 83 | 0.00 | |
| 6 | 244° C. | 10 lbs/hr | 7.1 | 82 | 0.00 | |
| 7 | 255° C. | 10 lbs/hr | 7.1 | 88 | | 19Y .9R |
| 8 | 255° C. | 10 lbs/hr | 5.3 | 90 | 0.00 | |
| 9 | 255° C. | 5 lbs/hr | 10.1 | 91 | | |
| 10 | 255° C. | 5 lbs/hr | 12.9 | 91 | | 13Y .9R |
| 11 | 244° C. | 5 lbs/hr | 13.9 | 89 | | |

TABLE 2-continued

Optimization of Removal of Cholesterol from Extraction Oil

| | PROCESS TEMP | FLOW RATE | % STEAM | % CHOL. REDUCTION | PEROXIDES | LOVIBOND |
|---|---|---|---|---|---|---|
| 12 | 244° C. | 5 lbs/hr | 10.1 | 90 | | |
| 13 | 255° C. | 10 lbs/hr | 10.1 | 87 | | 20Y 1.3R |
| 14 | 244° C. | 10 lbs/hr | 13.8 | 91 | | |
| 15 | 244° C. | 10 lbs/hr | 13.8 | 90 | 0.00 | |
| 16 | 244° C. | 10 lbs/hr | 10.1 | 86 | 0.00 | |
| 17 | 244° C. | 15 lbs/hr | 5.6 | 82 | | |
| 18 | 244° C. | 15 lbs/hr | 10.1 | 86 | | |
| 19 | 255° C. | 15 lbs/hr | 10.1 | 87 | 0.00 | |
| 20 | 255° C. | 15 lbs/hr | 5.7 | 87 | 0.00 | 20Y 1.0R |
| 21 | 255° C. | 10 lbs/hr | 5.7 | — | | |
| 22 | 255° C. | 10 lbs/hr | 14.6 | — | | |
| 23 | 244° C. | 10 lbs/hr | 5.8 | — | | |
| 24 | 244° C. | 10 lbs/hr | 14.1 | — | | |

TABLE 3

| SAMPLE | PASS NUMBER RECYCLING | CHOLESTEROL % IN OIL | REDUCTION % | LOVIBOND COLOR |
|---|---|---|---|---|
| 1 | 0+ | 0.371* | — | 20Y 3.0R |
| 1 | 0+ | 0.036 | 90% | |
| 1 | 1 | 0.370* | — | 19Y 2.0R |
| 1 | 1 | 0.038 | 90% | — |
| 1 | 2 | 0.450* | — | 30Y 2.1R |
| 1 | 2 | 0.059 | 87% | 18Y 1.4R |
| 1 | 3 | 0.470* | — | 30Y 2.1R |
| 1 | 3 | 0.077 | 84% | 16Y 2.0R |
| 1 | 4 | 0.470* | — | 17Y 2.6R |
| 1 | 4 | 0.096 | 80% | 16Y 1.0R |
| 1 | 5 | 0.500* | — | 30Y 2.1R |
| 1 | 5 | 0.085 | 83% | 12Y 2.1R |
| 1 | 6 | 0.490* | — | 12Y 1.0R |
| 1 | 6 | 0.091 | 83% | 20Y 2.3R |

*is % cholesterol in the extraction oil before steam stripping.
+ is fresh oil used for the cholesterol extraction for egg yolk.
+ is % cholesterol in the extraction oil after steam stripping.

TABLE 4

| Nutrient | % Extracted |
|---|---|
| Cholesterol | 92.7 |
| Vitamin A (IU/g) | 94.7 |

TABLE 5

| NUTRIENTS | REGULAR YOLK (PER 100 G) | REDUCED CHOLESTEROL YOLK (PER 100 G) |
|---|---|---|
| Moisture (g) | 54.0 | 54.0 |
| Protein (g) | 15.0 | 20.0 |
| Carbohydrates (g) | 2.0 | 7.0 |
| Fat (g) | 28.0 | 16.0 |
| Ash (g) | 1.7 | 2.3 |
| Calories (Kcal) | 320 | 260 |
| % Calories from Fat | 80 | 55 |
| % Calories from Saturated Fat | 29 | 16 |
| Saturated Fatty Acids (g) | 8.5 | 4.6 |
| Monounsaturated Fatty Acids (g) | 10.5 | 4.0 |
| Polyunsaturated Fatty Acids (g) | 9.0 | 6.7 |
| Cholesterol (mg) | 1150 | 163 |

Cholesterol was reduced by 87 after double extraction.

TABLE 6

| NUTRIENTS | REGULAR YOLK (PER 100 G) | CHOLESTEROL REDUCED YOLK | | |
|---|---|---|---|---|
| | | 1ST RECYCLE (PER 100 G) | 3RD RECYCLE (PER 100 G) | 6TH RECYCLE (PER 100 G) |
| Moisture (g) | 52.0 | 55.0 | 58.9 | 61.8 |
| Protein (g) | 17.0 | 16.8 | 16.5 | 16.5 |
| Carbohydrates (g) | 1.0 | 2.6 | 2.9 | 1.7 |
| Fat (g) | 28.0 | 21.0 | 18.9 | 17.9 |
| Ash (g) | 2.5 | 2.1 | 2.2 | 1.6 |
| Calories (Kcal) | 320 | 267 | 248 | 234 |
| % Calories from Fat | 79 | 71 | 69 | 69 |
| % Calories from Saturated Fat | 24 | 31 | 31 | 23 |
| Saturated Fatty Acids (g) | 8.6 | 9.1 | 9.1 | 6.0 |
| Monounsaturated Fatty Acids (g) | 7.0 | 7.0 | 7.0 | 5.7 |
| Polyunsaturated Fatty Acids (g) | 3.8 | 2.1 | 2.1 | 5.9 |
| Cholesterol (mg) | 1282 | 431 | 426 | 378 |

Cholesterol is reduced 67–71%.

TABLE 7

Evaluation of Sponge Cake Made From Regular Whole Eggs and Cholesterol Reduced Whole Eggs

| SPONGE CAKE | BATTER WEIGHT (G) | CAKE VOLUME (CM$^3$) | CAKE HEIGHT (CM) |
|---|---|---|---|
| Regular Whole Eggs | 75 | 356 | 3.6 |
| Cholesterol Reduced Whole Eggs | 75 | 347 | 3.5 |

TABLE 8

Evaluation of Sponge Cake Made with Cholesterol Reduced Whole Eggs from Recycled Oil Trials

| SPONGE CAKE (OIL CYCLE) | BATTER WEIGHT (G) | CAKE VOLUME (CM$^3$) | CAKE HEIGHT (CM) |
|---|---|---|---|
| 1st Cycle | 100 | 352 | 3.8 |
| 6th Cycle | 100 | 353 | 3.9 |

TABLE 9

Standard and Modified Sponge Cake Formula

| Ingredients | Standard % | Modified % |
|---|---|---|
| Whole Egg | 37.25 | 36.79 |
| Flour | 28.60 | 28.25 |
| Sugar | 33.90 | 33.48 |
| Baking Powder | 0.25 | 1.48 |

TABLE 10

Summary of Preference Data of Mayonnaise (Reduced-cholesterol vs. Regular)

| JUDGES | SAMPLE SIZE (N) | PREFER REDUCED CHOLESTEROL MAYONNAISE (A) | NO PREFERENCE (B) | PREFER REGULAR MAYONNAISE (C) | CHI-SQUARE PROBABILITY (A vs. B vs. C) | BINOMIAL PROBABILITY |
|---|---|---|---|---|---|---|
| Discriminators | N = 11 | 4 | 2 | 5 | P < 0.20 | maj. P > 0.55 |
| Total | N = 52 | 18 | 17 | 17 | P < 0.20 | maj. P = 0.019 |

TABLE 11

Summary of Preference Data of Sponge Cake (Reduced-Cholesterol vs. Regular)

| JUDGES | SAMPLE SIZE (N) | PREFER REDUCED CHOLESTEROL SPONGE CAKE (A) | NO PREFERENCE (B) | PREFER REGULAR SPONGE CAKE (C) | CHI-SQUARE PROBABILITY (A vs. B vs. C) | BINOMIAL PROBABILITY |
|---|---|---|---|---|---|---|
| Discriminators | N = 14 | 4 | 0 | 10 | P < 0.01 | maj. P > 0.180 |
| Total | N = 48 | 18 | 6 | 24 | P < 0.01 | maj. P = 0.885 |

TABLE 12

Summary of Preference Data of Sponge Cake
(1st Cycle Oil vs. 6th Cycle Oil)

| JUDGES | SAMPLE SIZE (N) | PREFER 6TH CYCLE SPONGE CAKE (A) | NO PREFERENCE (B) | PREFER 1ST CYCLE SPONGE CAKE (C) | CHI-SQUARE PROBABILITY (A vs. B vs. C) | BINOMIAL PROBABILITY |
|---|---|---|---|---|---|---|
| Discriminators | N = 11 | 7 | 2 | 2 | $P < 0.10$ | maj. $P > 0.0065$ |
| Total | N = 57 | 21 | 21 | 15 | $P < 0.20$ | maj. $P = 0.0006$ |

TABLE 13

Summary of Preference Data of Scrambled Eggs
(1st Cycle Oil vs. 6th Cycle Oil)

| JUDGES | SAMPLE SIZE (N) | PREFER 6TH CYCLE SCRAMBLED EGGS (A) | NO PREFERENCE (B) | PREFER 1ST CYCLE SCRAMBLED EGGS (C) | CHI-SQUARE PROBABILITY (A vs. B vs. C) | BINOMIAL PROBABILITY |
|---|---|---|---|---|---|---|
| Discriminators | N = 15 | 3 | 9 | 3 | $P < 0.10$ | maj. $P > 0.035$ |
| Total | N = 56 | 15 | 27 | 14 | $P < 0.05$ | maj. $p = 0.0003$ |

What is claimed is:

1. A method for removing at least 64% of cholesterol from an untreated liquid egg yolk in single extraction cycle, and for recovering extracted cholesterol as a second product, said method comprising steps:

(a) forming an egg yolk-oil emulsion by mixing in a mixer or a blender about 1 part, by weight, untreated egg yolk, with about 0.5–2 parts, by weight, of an extraction soybean oil wherein said oil is without added monoglyceride;

(b) submitting said emulsion to ultra high pressure homogenization to extract cholesterol from the egg yolk into the extraction oil, said homogenization performed at a pressure from about 4,000 psi to about 21,000 psi in an ultra high pressure homogenizer able to withstand pressure from at least 4,000 psi to about 21,000 psi, said homogenization further performed under vacuum in an airless system comprising an aerator, for 2–10 minutes, with minimum six passes of the emulsion of step (a) through the ultra high pressure homogenizer in the single extraction cycle, said homogenization performed at extraction temperature between 40°–45° C.;

(c) separating the liquid egg yolk having reduced amount of cholesterol by at least 64% from the extraction oil containing cholesterol extracted from the egg yolk;

(d) removing about 80% of cholesterol from the extraction oil of step (c) by steam stripping;

(e) recovering the extraction oil of step (d); and (f) recovering solid cholesterol as the second product.

2. The method of claim 1 wherein the extraction step (b) is performed at a pressure between 4,000 psi to 6,000 psi and the liquid egg yolk having reduced amount of cholesterol is separated from the extraction oil containing cholesterol by centrifugation at 2,000–20,000 rpm for 2–60 minutes.

3. The method of claim 2 wherein a ratio of egg yolk to vegetable oil is about 1:2.

4. The method of claim 3 wherein cholesterol is removed as the second product from the extraction oil by steam stripping performed at temperatures between about 230° C.–260° C., under vacuum.

5. The method of claim 4 wherein during the steam stripping the extraction oil is treated with a steam in a steam to oil ratio from about 5% to about 15%, at temperature about 255° C. with a flow rate from 5–15 lbs/hour.

6. The method of claim 5 wherein during the steam stripping cholesterol is recovered as the second product from an aqueous steam distillate by condensation and removal of the steam under vacuum, and by collecting solidified cholesterol from the steam distillate into a cold trap under vacuum.

7. The method of claim 1 wherein the extraction cycle, steps (a) and (b), are repeated one or more times to achieve at least 80% cholesterol reduction in the egg yolk and wherein the oil used for extraction is the oil recovered in steps (d) and (e) following the steam stripping.

8. A method for removing at least 64% of cholesterol from an untreated liquid egg yolk in a single extraction cycle and for recovering extracted cholesterol as a second product, said method comprising steps:

(a) forming an egg yolk-oil emulsion by mixing in a mixer or a blender about 1 part, by weight, untreated egg yolk with about 0.5–4 parts, by weight, an extraction vegetable oil without added monoglyceride;

(b) submitting said emulsion to ultra high pressure homogenization to extract cholesterol from the egg yolk into the extraction oil, said homogenization performed at a pressure from about 4,000 psi to about 21,000 psi, in an ultra high pressure homogenizer able to withstand pressure from at least 4,000 psi to about 21,000 psi, said homogenization further performed under vacuum for 2–10 minutes, with minimum six passes of the emulsion of step (a) through the ultra high pressure homogenizer in the single extraction cycle, said homogenization performed at extraction temperature between 40°–45° C.;

(c) separating the liquid egg yolk having reduced amount of cholesterol by at least 65% from the extraction oil containing cholesterol extracted from the egg yolk;

(d) removing at least about 80% of cholesterol from the extraction oil separated from the egg yolk in step (c); and (e) recovering cholesterol as the second product.

9. The method of claim 8 wherein the extraction step (b) is performed at a pressure between 4,000 to 6,000 psi and the liquid egg yolk having reduced amount of cholesterol is separated from the extraction oil containing cholesterol by centrifugation at 2,000–20,000 rpm for 2–60 minutes.

10. The method of claim 9 wherein a ratio of egg yolk to the vegetable oil is about 1:2.

11. The method of claim 10 wherein the vegetable oil is selected from a group consisting of corn oil, canola oil, cotton seed oil, soybean oil, sesame seed oil, sunflower seed oil, pumpkin oil, palm oil, safflower seed oil, rice bran oil, grape seed oil and peanut oil.

12. The method of claim 11 wherein the vegetable oil is soybean oil.

13. The method of claim 12 wherein the cholesterol is removed as the second product from the extraction oil by steam stripping.

14. The method of claim 13 wherein the steam stripping is performed at temperatures between about 230° C.–260° C. under vacuum.

15. The method of claim 14 wherein the extraction oil is treated with a steam in a steam to oil ratio from about 5% to about 15%, at temperature about 255° C. with a flow rate from 5–15 lbs/hour.

16. The method of claim 10 wherein cholesterol is recovered as the second product from the aqueous steam distillate by condensation and removal of the steam under vacuum and by collecting solidified cholesterol from the steam distillate in a cold trap under vacuum.

* * * * *